(12) United States Patent
Fitzgibbon et al.

(10) Patent No.: US 10,862,924 B2
(45) Date of Patent: Dec. 8, 2020

(54) METHOD AND APPARATUS TO FACILITATE MESSAGE TRANSMISSION AND RECEPTION USING DIFFERENT TRANSMISSION CHARACTERISTICS

(71) Applicant: The Chamberlain Group, Inc., Elmhurst, IL (US)

(72) Inventors: James J. Fitzgibbon, Batavia, IL (US); Edward Thomas Laird, Lombard, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 14/867,633

(22) Filed: Sep. 28, 2015

(65) Prior Publication Data

US 2016/0021140 A1    Jan. 21, 2016

Related U.S. Application Data

(63) Continuation of application No. 11/172,525, filed on Jun. 30, 2005, now Pat. No. 9,148,409.

(51) Int. Cl.
*H04L 29/06* (2006.01)
*G07C 9/00* (2020.01)

(52) U.S. Cl.
CPC ...... *H04L 63/1475* (2013.01); *G07C 9/00309* (2013.01); *H04L 63/0428* (2013.01);
(Continued)

(58) Field of Classification Search
CPC .................................. H04L 45/00; G06F 9/00
See application file for complete search history.

(56) References Cited

U.S. PATENT DOCUMENTS

D29,525 S     8/1860  Sherman
D30,957 S    12/1860  Campbell
(Continued)

FOREIGN PATENT DOCUMENTS

AU    645228    1/1994
AU    710682    9/1999
(Continued)

OTHER PUBLICATIONS

Canadian Patent Application No. 2,926,281, Canadian Office Action dated Dec. 29, 2016.
(Continued)

*Primary Examiner* — Joseph P Hirl
*Assistant Examiner* — Leynna Truvan
(74) *Attorney, Agent, or Firm* — Fitch, Even, Tabin & Flannery LLP

(57) ABSTRACT

Upon providing (101) message content (such as a remote control instruction) to be transmitted, and in conjunction with provision (102) of a plurality of different transmission characteristics (as correspond, for example, to different types of transmission) and a corresponding plurality of correlated recovery identifiers (103), a particular transmission characteristic is selected (104) and used to transmit (105) a joint message. In particular, in a preferred approach, the selected transmission characteristic (106) is used when transmitting at least a portion of the message content portion of the joint message while another part of the joint message carries the recovery identifier to thereby facilitate selection of an appropriate reception technique by a receiver when receiving the joint message.

44 Claims, 3 Drawing Sheets

(52) U.S. Cl.
CPC .. *H04L 63/123* (2013.01); *G07C 2009/00412* (2013.01); *G07C 2009/00476* (2013.01); *G07C 2009/00492* (2013.01); *G07C 2009/00555* (2013.01)

(56) References Cited

U.S. PATENT DOCUMENTS

| | | |
|---|---|---|
| D35,364 S | 5/1862 | Cox |
| 2,405,500 A | 8/1946 | Gustav |
| 3,716,865 A | 2/1973 | Willmott |
| 3,735,106 A | 5/1973 | Hollaway |
| 3,792,446 A | 2/1974 | Mc |
| 3,798,359 A | 3/1974 | Feistel |
| 3,798,360 A | 3/1974 | Feistel |
| 3,798,544 A | 3/1974 | Norman |
| 3,798,605 A | 3/1974 | Feistel |
| 3,845,277 A | 10/1974 | Spetz |
| 3,890,601 A | 6/1975 | Pietrolewicz |
| 3,906,348 A | 9/1975 | Willmott |
| 3,938,091 A | 2/1976 | Atalla |
| 4,037,201 A | 7/1977 | Willmott |
| 4,064,404 A | 12/1977 | Willmott |
| RE29,525 E | 1/1978 | Willmott |
| 4,078,152 A | 3/1978 | Tuckerman |
| 4,097,859 A | 6/1978 | Looschen |
| 4,138,735 A | 2/1979 | Allocca |
| 4,178,549 A | 12/1979 | Ledenbach |
| 4,195,196 A | 3/1980 | Feistel |
| 4,195,200 A | 3/1980 | Feistel |
| 4,196,310 A | 4/1980 | Forman |
| 4,218,738 A | 8/1980 | Matyas |
| 4,243,976 A | 1/1981 | Warner |
| 4,255,742 A | 3/1981 | Gable |
| 4,304,962 A | 12/1981 | Fracassi |
| 4,305,060 A | 12/1981 | Apple |
| 4,316,055 A | 2/1982 | Feistel |
| 4,326,098 A | 4/1982 | Bouricius |
| 4,327,444 A | 4/1982 | Court |
| 4,328,414 A | 5/1982 | Atalla |
| 4,328,540 A | 5/1982 | Matsuoka |
| RE30,957 E | 6/1982 | Feistel |
| 4,380,762 A | 4/1983 | Capasso |
| 4,385,296 A | 5/1983 | Tsubaki |
| 4,387,455 A | 6/1983 | Schwartz |
| 4,387,460 A | 6/1983 | Boutmy |
| 4,393,269 A | 7/1983 | Konheim |
| 4,418,333 A | 11/1983 | Schwarzbach |
| 4,426,637 A | 1/1984 | Apple |
| 4,445,712 A | 5/1984 | Smagala-Romanoff |
| 4,447,890 A | 5/1984 | Duwel |
| 4,454,509 A | 6/1984 | Buennagel |
| 4,464,651 A | 8/1984 | Duhame |
| 4,468,787 A | 8/1984 | Keiper |
| 4,471,493 A | 9/1984 | Schober |
| 4,471,593 A | 9/1984 | Ragland |
| 4,491,774 A | 1/1985 | Schmitz |
| 4,509,093 A | 4/1985 | Stellberger |
| 4,529,980 A | 7/1985 | Liotine |
| 4,535,333 A | 8/1985 | Twardowski |
| 4,566,044 A | 1/1986 | Langdon |
| 4,574,247 A | 3/1986 | Jacob |
| 4,578,530 A | 3/1986 | Zeidler |
| 4,580,111 A | 4/1986 | Swanson |
| 4,581,606 A | 4/1986 | Mallory |
| 4,590,470 A | 5/1986 | Koenig |
| 4,593,155 A | 6/1986 | Hawkins |
| 4,596,898 A | 6/1986 | Pemmaraju |
| 4,596,985 A | 6/1986 | Bongard |
| 4,599,489 A | 7/1986 | Cargile |
| 4,602,357 A | 7/1986 | Yang |
| 4,611,198 A | 9/1986 | Levinson |
| 4,623,887 A | 11/1986 | Welles |
| 4,626,848 A | 12/1986 | Ehlers |
| 4,628,315 A | 12/1986 | Douglas |
| 4,630,035 A | 12/1986 | Stahl |
| 4,633,247 A | 12/1986 | Hegeler |
| 4,638,433 A | 1/1987 | Schindler |
| 4,646,080 A | 2/1987 | Genest |
| 4,652,860 A | 3/1987 | Weishaupt |
| 4,653,076 A | 3/1987 | Jerrim |
| 4,670,746 A | 6/1987 | Taniguchi |
| 4,677,284 A | 6/1987 | Genest |
| 4,686,529 A | 8/1987 | Kleefeldt |
| 4,695,839 A | 9/1987 | Barbu |
| 4,703,359 A | 10/1987 | Rumbolt |
| 4,710,613 A | 12/1987 | Shigenaga |
| 4,716,301 A | 12/1987 | Willmott |
| 4,720,860 A | 1/1988 | Weiss |
| 4,723,121 A | 2/1988 | Van |
| 4,731,575 A | 3/1988 | Sloan |
| 4,737,770 A | 4/1988 | Brunius |
| 4,740,792 A | 4/1988 | Sagey |
| 4,750,118 A | 6/1988 | Heitschel |
| 4,754,255 A | 6/1988 | Sanders |
| 4,755,792 A | 7/1988 | Pezzolo |
| 4,758,835 A | 7/1988 | Rathmann |
| 4,761,808 A | 8/1988 | Howard |
| 4,779,090 A | 10/1988 | Micznik |
| 4,794,268 A | 12/1988 | Nakano |
| 4,794,622 A | 12/1988 | Isaacman |
| 4,796,181 A | 1/1989 | Wiedemer |
| 4,799,061 A | 1/1989 | Abraham |
| 4,800,590 A | 1/1989 | Vaughan |
| 4,802,114 A | 1/1989 | Sogame |
| 4,804,938 A | 2/1989 | Rouse |
| 4,807,052 A | 2/1989 | Amano |
| 4,808,995 A | 2/1989 | Clark |
| 4,825,200 A | 4/1989 | Evans |
| 4,825,210 A | 4/1989 | Bachhuber |
| 4,829,296 A | 5/1989 | Clark |
| 4,831,509 A | 5/1989 | Jones |
| 4,835,407 A | 5/1989 | Kataoka |
| 4,845,491 A | 7/1989 | Fascenda |
| 4,847,614 A | 7/1989 | Keller |
| 4,850,046 A | 7/1989 | Philippe |
| 4,855,713 A | 8/1989 | Brunius |
| 4,856,062 A | 8/1989 | Weiss |
| 4,856,081 A | 8/1989 | Smith |
| 4,859,990 A | 8/1989 | Isaacman |
| 4,870,400 A | 9/1989 | Downs |
| 4,878,052 A | 10/1989 | Schulze |
| 4,881,148 A | 11/1989 | Lambropoulos |
| 4,885,778 A | 12/1989 | Weiss |
| 4,888,575 A | 12/1989 | De Vaulx |
| 4,890,108 A | 12/1989 | Drori |
| 4,893,338 A | 1/1990 | Pastor |
| 4,905,279 A | 2/1990 | Nishio |
| 4,910,750 A | 3/1990 | Fisher |
| 4,912,463 A | 3/1990 | Li |
| 4,914,696 A | 4/1990 | Dudczak |
| 4,918,690 A | 4/1990 | Markkula |
| 4,922,168 A | 5/1990 | Ivaggamon |
| 4,922,533 A | 5/1990 | Philippe |
| 4,928,098 A | 5/1990 | Dannhaeuser |
| 4,931,789 A | 6/1990 | Pinnow |
| 4,939,792 A | 7/1990 | Urbish |
| 4,942,393 A | 7/1990 | Waraksa |
| 4,951,029 A | 8/1990 | Severson |
| 4,963,876 A | 10/1990 | Sanders |
| 4,979,832 A | 12/1990 | Ritter |
| 4,980,913 A | 12/1990 | Skret |
| 4,988,990 A | 1/1991 | Warrior |
| 4,988,992 A | 1/1991 | Heitschel |
| 4,992,783 A | 2/1991 | Zdunek |
| 4,999,622 A | 3/1991 | Amano |
| 5,001,332 A | 3/1991 | Schrenk |
| 5,021,776 A | 6/1991 | Anderson |
| 5,023,908 A | 6/1991 | Weiss |
| 5,049,867 A | 9/1991 | Stouffer |
| 5,055,701 A | 10/1991 | Takeuchi |
| 5,058,161 A | 10/1991 | Weiss |
| 5,060,263 A | 10/1991 | Bosen |
| 5,091,942 A | 2/1992 | Dent |
| 5,103,221 A | 4/1992 | Memmola |

(56) References Cited

U.S. PATENT DOCUMENTS

| | | |
|---|---|---|
| 5,107,258 A | 4/1992 | Soum |
| 5,126,959 A | 6/1992 | Kurihara |
| 5,136,548 A | 8/1992 | Claar |
| 5,144,667 A | 9/1992 | Pogue |
| 5,146,067 A | 9/1992 | Sloan |
| 5,148,159 A | 9/1992 | Clark |
| 5,150,464 A * | 9/1992 | Sidhu ............... H04L 29/06 709/222 |
| 5,153,581 A | 10/1992 | Hazard |
| 5,159,329 A | 10/1992 | Lindmayer |
| 5,168,520 A | 12/1992 | Weiss |
| 5,193,210 A | 3/1993 | Nicholas |
| 5,197,061 A | 3/1993 | Halbert-Lassalle |
| 5,224,163 A | 6/1993 | Gasser |
| 5,237,614 A | 8/1993 | Weiss |
| 5,252,960 A | 10/1993 | Duhame |
| 5,278,907 A | 1/1994 | Snyder |
| 5,280,527 A | 1/1994 | Gullman |
| 5,331,325 A | 7/1994 | Miller |
| 5,361,062 A | 11/1994 | Weiss |
| 5,363,448 A | 11/1994 | Koopman |
| 5,365,225 A | 11/1994 | Bachhuber |
| 5,367,572 A | 11/1994 | Weiss |
| 5,369,706 A | 11/1994 | Latka |
| 5,412,379 A | 5/1995 | Waraksa |
| 5,414,418 A | 5/1995 | Andros |
| 5,420,925 A | 5/1995 | Michaels |
| 5,442,340 A | 8/1995 | Dykema |
| 5,442,341 A | 8/1995 | Lambropoulos |
| 5,444,737 A | 8/1995 | Cripps |
| 5,463,376 A | 10/1995 | Stoffer |
| 5,471,668 A | 11/1995 | Soenen |
| 5,473,318 A | 12/1995 | Martel |
| 5,479,512 A | 12/1995 | Weiss |
| 5,485,519 A | 1/1996 | Weiss |
| 5,517,187 A | 5/1996 | Bruwer |
| 5,528,621 A | 6/1996 | Heiman |
| 5,530,697 A | 6/1996 | Watanabe |
| 5,554,977 A | 9/1996 | Jablonski |
| RE35,364 E | 10/1996 | Heitschel |
| 5,563,600 A | 10/1996 | Miyake |
| 5,565,812 A | 10/1996 | Soenen |
| 5,566,359 A | 10/1996 | Corrigan |
| 5,576,701 A | 11/1996 | Heitschel |
| 5,578,999 A | 11/1996 | Matsuzawa |
| 5,594,429 A | 1/1997 | Nakahara |
| 5,598,475 A | 1/1997 | Soenen |
| 5,600,653 A | 2/1997 | Chitre |
| 5,608,723 A | 3/1997 | Felsenstein |
| 5,635,913 A | 6/1997 | Willmott |
| 5,657,388 A | 8/1997 | Weiss |
| 5,673,017 A | 9/1997 | Dery |
| 5,678,213 A | 10/1997 | Myer |
| 5,680,131 A | 10/1997 | Utz |
| 5,686,904 A | 11/1997 | Bruwer |
| 5,699,065 A | 12/1997 | Murray |
| 5,719,619 A | 2/1998 | Hattori et al. |
| 5,745,068 A | 4/1998 | Takahashi |
| 5,774,065 A | 6/1998 | Mabuchi |
| 5,778,348 A | 7/1998 | Manduley |
| 5,838,747 A | 11/1998 | Matsumoto |
| 5,872,519 A | 2/1999 | Issa |
| 5,898,397 A | 4/1999 | Murray |
| 5,923,758 A | 7/1999 | Khamharn |
| 5,936,999 A | 8/1999 | Keskitalo |
| 5,937,065 A | 8/1999 | Simon |
| 5,942,985 A | 8/1999 | Chin |
| 5,949,349 A | 9/1999 | Farris |
| 6,012,144 A | 1/2000 | Pickett |
| 6,049,289 A | 4/2000 | Waggamon |
| 6,052,408 A | 4/2000 | Trompower |
| 6,070,154 A | 5/2000 | Tavor |
| 6,094,575 A | 7/2000 | Anderson et al. |
| 6,154,544 A | 11/2000 | Farris |
| 6,157,719 A | 12/2000 | Wasilewski |
| 6,166,650 A | 12/2000 | Bruwer |
| 6,175,312 B1 | 1/2001 | Bruwer |
| 6,181,255 B1 | 1/2001 | Crimmins |
| 6,243,000 B1 | 6/2001 | Tsui |
| 6,275,519 B1 | 8/2001 | Hendrickson |
| 6,414,587 B1 | 7/2002 | Fitzgibbon |
| 6,414,986 B1 | 7/2002 | Usui |
| 6,456,726 B1 | 9/2002 | Yu |
| 6,463,538 B1 | 10/2002 | Elteto |
| 6,496,477 B1 | 12/2002 | Perkins |
| 6,535,544 B1 | 3/2003 | Partyka |
| 6,549,949 B1 | 4/2003 | Bowman-Amuah |
| 6,609,796 B2 | 8/2003 | Maki et al. |
| 6,640,244 B1 | 10/2003 | Bowman-Amuah |
| 6,688,518 B1 | 2/2004 | Valencia |
| 6,690,796 B1 | 2/2004 | Farris |
| 6,697,379 B1 | 2/2004 | Jacquet |
| 6,754,266 B2 | 6/2004 | Bahl |
| 6,810,123 B2 | 10/2004 | Farris |
| 6,829,357 B1 | 12/2004 | Alrabady |
| 6,850,910 B1 | 2/2005 | Yu |
| 6,930,983 B2 | 8/2005 | Perkins |
| 6,956,460 B2 | 10/2005 | Tsui |
| 6,963,561 B1 | 11/2005 | Lahat |
| 6,980,518 B1 | 12/2005 | Sun |
| 6,980,655 B2 | 12/2005 | Farris |
| 6,988,977 B2 | 2/2006 | Gregori |
| 6,998,977 B2 | 2/2006 | Gregori |
| 7,002,490 B2 | 2/2006 | Lablans |
| 7,039,397 B2 | 5/2006 | Chuey |
| 7,039,809 B1 | 5/2006 | Wankmueller |
| 7,042,363 B2 | 5/2006 | Katrak |
| 7,050,479 B1 | 5/2006 | Kim |
| 7,050,794 B2 | 5/2006 | Chuey et al. |
| 7,057,494 B2 | 6/2006 | Fitzgibbon |
| 7,057,547 B2 * | 6/2006 | Olmsted ............... E05F 15/77 340/12.3 |
| 7,068,181 B2 | 6/2006 | Chuey |
| 7,071,850 B1 | 7/2006 | Fitzgibbon |
| 7,088,218 B2 | 8/2006 | Chuey |
| 7,088,706 B2 | 8/2006 | Zhang et al. |
| 7,139,398 B2 | 11/2006 | Candelore |
| 7,161,466 B2 | 1/2007 | Chuey |
| 7,298,721 B2 | 11/2007 | Atarashi et al. |
| 7,301,900 B1 | 11/2007 | Laksono |
| 7,332,999 B2 | 2/2008 | Fitzgibbon |
| 7,333,615 B1 | 2/2008 | Jarboe |
| 7,336,787 B2 | 2/2008 | Unger |
| 7,346,163 B2 | 3/2008 | Pedlow |
| 7,353,499 B2 | 4/2008 | De Jong |
| 7,406,553 B2 | 7/2008 | Edirisooriya et al. |
| 7,412,056 B2 | 8/2008 | Farris |
| 7,415,618 B2 | 8/2008 | De Jong |
| 7,429,898 B2 | 9/2008 | Akiyama |
| 7,447,498 B2 | 11/2008 | Chuey et al. |
| 7,489,922 B2 | 2/2009 | Chuey |
| 7,492,898 B2 | 2/2009 | Farris et al. |
| 7,492,905 B2 | 2/2009 | Fitzgibbon |
| 7,516,325 B2 | 4/2009 | Willey |
| 7,535,926 B1 | 5/2009 | Deshpande |
| 7,545,942 B2 | 6/2009 | Cohen et al. |
| 7,548,153 B2 | 6/2009 | Gravelle et al. |
| 7,561,075 B2 | 7/2009 | Fitzgibbon |
| 7,564,827 B2 | 7/2009 | Das et al. |
| 7,598,855 B2 | 10/2009 | Scalisi et al. |
| 7,623,663 B2 | 11/2009 | Farris |
| 7,668,125 B2 | 2/2010 | Kadous |
| 7,741,951 B2 | 6/2010 | Fitzgibbon |
| 7,742,501 B2 | 6/2010 | Williams |
| 7,757,021 B2 | 7/2010 | Wenzel |
| 7,764,613 B2 | 7/2010 | Miyake et al. |
| 7,786,843 B2 | 8/2010 | Witkowski |
| 7,812,739 B2 | 10/2010 | Chuey |
| 7,839,851 B2 | 11/2010 | Kozat |
| 7,855,633 B2 | 12/2010 | Chuey |
| 7,999,656 B2 | 8/2011 | Fisher |
| 8,014,377 B2 | 9/2011 | Zhang et al. |
| 8,130,079 B2 | 3/2012 | McQuaide, Jr. et al. |
| 8,194,856 B2 | 6/2012 | Farris |

(56) References Cited

U.S. PATENT DOCUMENTS

| | | | |
|---|---|---|---|
| 8,207,818 B2 | 6/2012 | Keller, Jr. | |
| 8,209,550 B2 | 6/2012 | Gehrmann | |
| 8,225,094 B2 | 7/2012 | Willey | |
| 8,233,625 B2 | 7/2012 | Farris | |
| 8,266,442 B2* | 9/2012 | Burke | G06F 21/32 |
| | | | 713/186 |
| 8,276,185 B2 | 9/2012 | Messina et al. | |
| 8,284,021 B2 | 10/2012 | Farris et al. | |
| 8,290,465 B2 | 10/2012 | Ryu et al. | |
| 8,416,054 B2 | 4/2013 | Fitzgibbon | |
| 8,422,667 B2 | 4/2013 | Fitzgibbon | |
| 8,452,267 B2 | 5/2013 | Friman | |
| 8,463,540 B2 | 6/2013 | Hannah et al. | |
| 8,536,977 B2 | 9/2013 | Fitzgibbon | |
| 8,544,523 B2 | 10/2013 | Mays | |
| 8,581,695 B2 | 11/2013 | Carlson et al. | |
| 8,615,562 B1 | 12/2013 | Huang et al. | |
| 8,633,797 B2 | 1/2014 | Farris et al. | |
| 8,634,777 B2 | 1/2014 | Ekbatani et al. | |
| 8,645,708 B2 | 2/2014 | Labaton | |
| 8,661,256 B2 | 2/2014 | Willey | |
| 8,699,704 B2 | 4/2014 | Liu et al. | |
| 8,760,267 B2 | 6/2014 | Bos et al. | |
| 8,787,823 B2 | 7/2014 | Justice et al. | |
| 8,830,925 B2 | 9/2014 | Kim et al. | |
| 8,836,469 B2 | 9/2014 | Fitzgibbon et al. | |
| 9,082,293 B2 | 7/2015 | Wellman et al. | |
| 9,124,424 B2 | 9/2015 | Aldis | |
| 9,142,064 B2 | 9/2015 | Muetzel et al. | |
| 9,160,408 B2 | 10/2015 | Krohne et al. | |
| 9,280,704 B2 | 3/2016 | Lei et al. | |
| 9,317,983 B2 | 4/2016 | Ricci | |
| 9,336,637 B2 | 5/2016 | Neil et al. | |
| 9,396,376 B1 | 7/2016 | Narayanaswami | |
| 9,413,453 B2 | 8/2016 | Sugitani et al. | |
| 9,418,326 B1 | 8/2016 | Narayanaswami | |
| 2001/0023483 A1 | 9/2001 | Kiyomoto | |
| 2002/0034303 A1 | 3/2002 | Farris | |
| 2002/0184504 A1 | 12/2002 | Hughes | |
| 2002/0191785 A1 | 12/2002 | McBrearty | |
| 2002/0191794 A1 | 12/2002 | Farris | |
| 2003/0056001 A1 | 3/2003 | Mate | |
| 2003/0070092 A1 | 4/2003 | Hawkes | |
| 2003/0072445 A1 | 4/2003 | Kuhlman | |
| 2003/0147536 A1 | 8/2003 | Andivahis | |
| 2003/0177237 A1 | 9/2003 | Stebbings | |
| 2003/0191949 A1 | 10/2003 | Odagawa | |
| 2003/0227370 A1* | 12/2003 | Brookbank | G07C 9/00182 |
| | | | 340/5.7 |
| 2004/0019783 A1 | 1/2004 | Hawkes | |
| 2004/0081075 A1 | 4/2004 | Tsukakoshi | |
| 2004/0174856 A1 | 9/2004 | Brouet | |
| 2004/0179485 A1 | 9/2004 | Terrier | |
| 2004/0181569 A1 | 9/2004 | Attar | |
| 2005/0053022 A1 | 3/2005 | Zettwoch | |
| 2005/0058153 A1 | 3/2005 | Santhoff | |
| 2005/0101314 A1 | 5/2005 | Levi | |
| 2005/0174242 A1 | 8/2005 | Cohen | |
| 2005/0285719 A1 | 12/2005 | Stephens | |
| 2006/0083187 A1 | 4/2006 | Dekel | |
| 2006/0109978 A1 | 5/2006 | Farris | |
| 2006/0176171 A1 | 8/2006 | Fitzgibbon | |
| 2007/0005806 A1 | 1/2007 | Fitzgibbon | |
| 2007/0006319 A1 | 1/2007 | Fitzgibbon | |
| 2007/0018861 A1 | 1/2007 | Fitzgibbon | |
| 2007/0058811 A1 | 3/2007 | Fitzgibbon | |
| 2007/0245147 A1 | 10/2007 | Okeya | |
| 2008/0229400 A1 | 9/2008 | Burke | |
| 2008/0297370 A1 | 12/2008 | Farris | |
| 2009/0016530 A1 | 1/2009 | Farris | |
| 2009/0021348 A1 | 1/2009 | Farris | |
| 2009/0096621 A1 | 4/2009 | Ferlitsch | |
| 2009/0176451 A1 | 7/2009 | Yang et al. | |
| 2009/0315672 A1 | 12/2009 | Nantz et al. | |
| 2010/0060413 A1 | 3/2010 | Fitzgibbon et al. | |
| 2010/0112979 A1 | 5/2010 | Chen et al. | |
| 2010/0125509 A1 | 5/2010 | Kranzley et al. | |
| 2010/0125516 A1 | 5/2010 | Wankmueller et al. | |
| 2010/0199092 A1 | 8/2010 | Andrus et al. | |
| 2010/0211779 A1 | 8/2010 | Sundaram | |
| 2011/0051927 A1 | 3/2011 | Murray et al. | |
| 2011/0296185 A1 | 12/2011 | Kamarthy et al. | |
| 2011/0316668 A1 | 12/2011 | Laird | |
| 2011/0316688 A1 | 12/2011 | Ranjan | |
| 2011/0317835 A1 | 12/2011 | Laird | |
| 2011/0320803 A1 | 12/2011 | Hampel et al. | |
| 2012/0054493 A1 | 3/2012 | Bradley | |
| 2012/0297681 A1 | 11/2012 | Krupke et al. | |
| 2013/0170639 A1 | 7/2013 | Fitzgibbon | |
| 2013/0268333 A1 | 10/2013 | Ovick et al. | |
| 2013/0272520 A1 | 10/2013 | Noda et al. | |
| 2014/0169247 A1 | 6/2014 | Jafarian et al. | |
| 2014/0289528 A1 | 9/2014 | Baghdasaryan | |
| 2015/0222517 A1 | 8/2015 | McLaughlin et al. | |
| 2015/0358814 A1 | 12/2015 | Roberts | |
| 2016/0021140 A1 | 1/2016 | Fitzgibbon | |
| 2016/0198391 A1 | 7/2016 | Orthmann et al. | |
| 2016/0261572 A1 | 9/2016 | Liu et al. | |

FOREIGN PATENT DOCUMENTS

| | | |
|---|---|---|
| AU | 2006200340 | 8/2006 |
| AU | 2006200340 A1 | 8/2006 |
| AU | 2008202369 A1 | 1/2009 |
| AU | 2011218848 A1 | 9/2011 |
| AU | 2011202656 A1 | 1/2012 |
| AU | 2007203558 B2 | 5/2014 |
| CA | 2087722 C | 7/1998 |
| CA | 2193846 C | 2/2004 |
| CA | 2177410 C | 4/2008 |
| CA | 2443452 C | 7/2008 |
| CA | 2684658 A1 | 10/2008 |
| CA | 2708000 A1 | 12/2010 |
| CA | 2456680 C | 2/2011 |
| CA | 2742018 A1 | 12/2011 |
| CA | 2565505 C | 9/2012 |
| CA | 2631076 C | 9/2013 |
| CA | 2790940 C | 6/2014 |
| CA | 2596188 C | 7/2016 |
| CN | 101399825 A | 4/2009 |
| DE | 3234538 A1 | 3/1984 |
| DE | 3234539 A1 | 3/1984 |
| DE | 3244049 A1 | 9/1984 |
| DE | 3309802 A1 | 9/1984 |
| DE | 3309802 C2 | 9/1984 |
| DE | 3320721 | 12/1984 |
| DE | 3332721 A1 | 3/1985 |
| DE | 3407436 A1 | 8/1985 |
| DE | 3407469 A1 | 9/1985 |
| DE | 3532156 A1 | 3/1987 |
| DE | 3636822 C1 | 10/1987 |
| DE | 1204463 | 8/1992 |
| EP | 0043270 A1 | 1/1982 |
| EP | 0103790 A2 | 3/1984 |
| EP | 0154019 A1 | 9/1985 |
| EP | 0155378 A1 | 9/1985 |
| EP | 0244322 | 11/1987 |
| EP | 0244332 B1 | 11/1987 |
| EP | 0311112 A2 | 4/1989 |
| EP | 0335912 | 10/1989 |
| EP | 0372285 | 6/1990 |
| EP | 0265935 B1 | 5/1991 |
| EP | 0459781 | 12/1991 |
| EP | 0857842 | 8/1998 |
| EP | 0937845 A1 | 8/1999 |
| EP | 1024626 A1 | 8/2000 |
| EP | 1223700 | 7/2002 |
| EP | 1313260 | 5/2003 |
| EP | 1421728 A1 | 5/2004 |
| EP | 1625560 A1 | 2/2006 |
| EP | 1760985 A2 | 3/2007 |
| EP | 0771498 B1 | 5/2007 |
| EP | 1865656 A1 | 12/2007 |
| EP | 2293478 A2 | 3/2011 |

(56) References Cited

FOREIGN PATENT DOCUMENTS

| | | |
|---|---|---|
| EP | 2149103 B1 | 12/2011 |
| EP | 2437212 A1 | 4/2012 |
| EP | 1875333 B1 | 1/2013 |
| EP | 2290872 B1 | 6/2014 |
| EP | 2800403 A1 | 11/2014 |
| FR | 2606232 | 5/1988 |
| FR | 2607544 | 6/1988 |
| FR | 2685520 | 6/1993 |
| FR | 2737373 | 1/1997 |
| GB | 218774 | 7/1924 |
| GB | 1156279 | 6/1969 |
| GB | 2023899 | 1/1980 |
| GB | 2051442 | 1/1981 |
| GB | 2099195 | 12/1982 |
| GB | 2118614 | 11/1983 |
| GB | 2131992 | 6/1984 |
| GB | 2133073 | 7/1984 |
| GB | 2184774 | 7/1987 |
| GB | 2254461 | 10/1992 |
| GB | 2265482 | 9/1993 |
| GB | 2288261 | 10/1995 |
| GB | 2430115 | 3/2007 |
| GB | 2440816 | 2/2008 |
| GB | 2453383 A | 4/2009 |
| JP | H6205474 | 7/1994 |
| JP | 09322274 | 12/1997 |
| WO | 9300137 | 1/1993 |
| WO | 9301140 | 1/1993 |
| WO | 9320538 | 10/1993 |
| WO | 9400147 | 1/1994 |
| WO | 9411829 | 5/1994 |
| WO | 9418036 | 8/1994 |
| WO | 0010301 | 2/2000 |
| WO | 0010302 | 2/2000 |
| WO | 03010656 | 2/2003 |
| WO | 03079607 A1 | 9/2003 |
| ZA | 8908225 | 10/1991 |

OTHER PUBLICATIONS

Australian Examiners First Report on Patent Application No. 2006202850 dated Feb. 25, 2010.
British Application No. GB1110709.1; Combined Search and Examination Report Under Sections 17 and 18(3); dated Sep. 29, 2011.
British Combined Search and Examination Report Under Sections 17 and 18(3); British Patent Application No. GB0920612.9; dated Dec. 16, 2009.
British Combined Search and Examination Report Under Sections 17 and 18(3); British Patent Application No. GB1000541.1; dated Jan. 28, 2010.
British Combined Search and Examination Report Under Sections 17 and 18(3); British Patent Application No. GB1104752.9; dated Apr. 11, 2011.
British Examination Report Under Section 17(5); British Application No. GB0715089.9 dated Nov. 28, 2007.
British Examination Report Under Section 18(3); British Patent Application No. GB0601795.8; dated Apr. 22, 2009.
British Examination Report Under Section 18(3); British Patent Application No. GB0613068.6; dated May 6, 2010.
British Examination Report Under Section 18(3); British Patent Application No. GB0613068.6; dated Nov. 26, 2010.
British Patent Application No. GB1110710.9; Combined Search and Examination Report Under Sections 17 and 18(3); dated Sep. 30, 2011.
British Search Report Under Section 17(5); British Patent Application No. GB0613068.6; dated Oct. 12, 2006.
British Search Report Under Section 17; British Patent Application No. GB0601795.8; dated May 22, 2006.
British Search Report Under Section 17; British Patent Application No. GB0613068.6; dated Aug. 23, 2006.
British Search Report Under Section 17; British Patent Application No. GB0715089.9; dated May 9, 2008.
British Search Report Under Section 18(3); British Patent Application No. GB0613068.6; dated Oct. 12, 2006.
Canadian Patent Application No. 2,551,295; Office Action dated May 6, 2013.
Examination Report Under Section 17 From British Patent Application No. GB0601795.8; dated Jan. 28, 2010.
Examination Report Under Section 17 From British Patent Application No. GB0601795.8; dated Sep. 25, 2009.
Examination Report Under Section 17 From British Patent Application No. GB0920612.9; dated Jan. 28, 2010.
Examination Report Under Section 18(3) From British Patent Application No. GB0613068.6; dated Jan. 31, 2011.
Examination Report Under Section 18(3) From British Patent Application No. GB0715089.9; dated Sep. 30, 2010.
Examination Report Under Section 18(3) from British Patent Application No. GB0715089.9 dated Apr. 11, 2011.
GB Examination Report; British Patent Application No. GB0613068.6; dated Nov. 26, 2010.
Office Action dated Mar. 21, 2011 from U.S. Appl. No. 11/172,525.
Search Report Under Section 17, Application No. GB0715089.9; dated Nov. 27, 2007.
Search Report Under Section 17; British Patent Application No. GB0715089.9; dated May 9, 2008.
Search Report Under Section 17 From British Patent Application No. GB0601795.8; dated Apr. 22, 2009.
U.S. Office Action dated Mar. 21, 2011 from U.S. Appl. No. 11/172,525.
U.S. Appl. No. 11/172,524; Office Action dated Apr. 9, 2009.
Office Action from U.S. Appl. No. 11/172,525 dated Apr. 9, 2009.
Australian Patent Application No. 2016203457; Examination Report No. 1; dated May 29, 2017.
Canadian Patent Application No. 2,926,281, Canadian Office Action dated Dec. 27, 2017.
Australian Patent Application No. 2017265017; First Examination Report dated Oct. 8, 2018; 4 pages.
German Patent Application No. 10 2006 003 808.8; Official Action dated Oct. 9, 2018 (with translation of relevant parts); 7 pages.
Abrams, and Podell, 'Tutorial Computer and Network Security,' District of Columbia: IEEE, 1987. pp. 1075-1081.
Abramson, Norman. 'The Aloha System—Another alternative for computer communications,' pp. 281-285, University of Hawaii, 1970.
Adams, Russ, Classified, data-scrambling program for Apple II, Info-World, vol. 5, No. 3; Jan. 31, 1988.
Alexi, Werner, et al. 'RSA and Rabin Functions: Certain Parts Are as Hard as the Whole', pp. 194-209, Siam Computing, vol. 14, No. 2, Apr. 1988.
Allianz: Allianz-Zentrum for Technik GmbH—Detailed Requirements for Fulfilling the Specification Profile for Electronically Coded OEM Immobilizers, Issue 22, (Jun. 1994 (Translation Jul. 5, 1994).
Anderson, Ross. 'Searching for the Optium Correlation Attack', pp. 137-143, Computer Laboratory, Pembroke Street, Cambridge CB2 3QG, Copyright 1995.
Arazi, Benjamin, Vehicular Implementations of Public Key Cryptographic Techniques, IEEE Transactions on Vehicular Technology, vol. 40, No. 3, Aug. 1991, 646-653.
Baran, P. Distribution Communications, vol. 9, 'Security Secrecy and Tamper-free Communications', Rand Corporation, 1964.
Barbaroux, Paul. 'Uniform Results in. Polynomial-Time Security', pp. 297-306, Advances in Cryptology—Eurocrypt 92, 1992.
Barlow, Mike, 'A Mathematical Word Block Cipher,' 12 Cryptologia 256-264 (1988).
Bellovin, S.M. 'Security Problems in the TCPIIP Protocol Suite', pp. 32-49, Computer Communication Review, New Jersey, Reprinted from Computer Communication Review, vol. 19, No. 2, pp. 32-48, Apr. 1989.
Bloch, Gilbert. Enigma Before Ultra Polish Work and the French Contribution, pp. 142-155, Cryptologia 11(3), (Jul. 1987).

(56) References Cited

OTHER PUBLICATIONS

Bosworth, Bruce, 'Codes, Ciphers, and Computers: An Introduction to Information Security' Hayden Book Company, Inc. 1982, pp. 30-54.

Brickell, Ernest F. and Stinson, Doug. 'Authentication Codes With Multiple Arbiters', pp. 51-55, Proceedings of Eurocrypt 88, 1988.

Bruwer, Frederick J. 'Die Toepassing Van Gekombineerde Konvolusiekodering en Modulasie op HF-Datakommunikasie,' District of Pretoria in South Africa Jul. 1998.

Burger, Chris R, Secure Learning RKE Systems Using KeeLoq. RTM. Encoders, TB001, 1996 Microchip Technology, Inc., 1-7.

Burmeister, Mike. A Remark on the Effiency of Identification Schemes, pp. 493-495, Advances in Cryptology—Eurocrypt 90, (1990).

Canadian Patent Application No. 2,926,281, Canadian Office Action dated Nov. 19, 2018.

Cattermole, K.W., 'Principles of Pulse Code Modulation' Iliffe Books Ltd., 1969, pp. 30-381.

Cerf, Vinton a 'Issues in Packet-Network Interconnection', pp. 1386-1408, Proceedings of the IEEE, 66(11), Nov. 1978.

Cerf, Vinton G. and Kahn, Robert E. 'A Protocol for Packet Network Intercommunication', pp. 637-648, Transactions on Communications, vol. Com-22, No. 5, May 1974.

Charles Watts, How to Program the HiSec(TM) Remote Keyless Entry Rolling Code Generator, National Semiconductor, Oct. 1994, 1-4.

Computer Arithmetic by Henry Jacobowitz; Library of Congress Catalog Card No. 62-13396; Copyright Mar. 1962 by John F. Rider Publisher, Inc.

Conner, Doug, Cryptographic Techniques—Secure Your Wireless Designs, EDN (Design Feature), Jan. 18, 1996, 57-68.

Coppersmith, Don. 'Fast Evaluation of Logarithms in Fields of Characteristic Two', IT-30(4): pp. 587-594, IEEE Transactions on Information Theory, Jul. 1984.

Daniels, George, 'Pushbutton Controls for Garage Doors' Popular Science (Aug. 1959), pp. 156-160.

Davies, D.W. and Price, W.C. 'Security for Computer Networks,' John Wiley and Sons, 1984. Chapter 7, pp. 175-176.

Davies, Donald W., 'Tutorial: The Security of Data in Networks,' pp. 13-17, New York: IEEE, 1981.

Davis, Ben and De Long, Ron. Combined Remote Key Conrol and Immobilization System for Vehicle Security, pp. 125-132, Power Electronics in Transportation, IEEE Catalogue No. 96TH8184, (Oct. 24, 1996).

Davis, Gregory and Palmer, Morris. Self-Programming, Rolling-Code Technology Creates Nearly Unbreakable RF Security, Technological Horizons, Texas Instruments, Inc. (ECN), (Oct. 1996).

Deavours, C. A. and Reeds, James. The Enigma, Part 1, Historical Perspectives, pp. 381-391, Cryptologia, 1(4), (Oct. 1977).

Deavours, C.A. and Kruh, L. 'The Swedish HC-9 Ciphering Machine', 251-285, Cryptologia, 13(3): Jul. 1989.

Deavours, Cipher A., et al. 'Analysis of the Hebern cryptograph Using Isomorphs', pp. 246-261, Cryptology: Yesterday, Today and Tomorrow, vol. 1, No. 2, Apr. 1977.

Denning, Dorothy E. 'Cryptographic Techniques', pp. 135-154, Cryptography and Data Security, 1982. Chapter 3.

Denning, Dorothy E. A Lattice Model of Secure Information Flow, pp. 236-238, 240, 242, Communications of the ACM, vol. 19, No. 5, (May 1976).

Diffie and Hellman, Exhaustive Cryptanalysis of the NB.S Data Encryption Standard, pp. 74-84, Computer, Jun. 1977.

Diffie, Whitfield and Hellman, Martin E. New Directions in Cryptography, pp. 644-654, IEEE Transactions on Information Theory, vol. IT-22, No. 6, (Nov. 1976).

Diffie, Whitfield and Hellman, Martin E. Privacy and Authentication: An Introduction to Cryptography, pp. 397-427, Proceedings of the IEEE, vol. 67, No. 3 (Mar. 1979).

Diffie, Whitfield and Hellman, Martin, E. 'An RSA Laboratories Technical Note', Version 1.4, Revised Nov. 1, 1993.

Documents Having Confidential Information Cited by Third Party as Relevant to the Subject Matter (Obtained from Notice Pursuant to 35 U.S.C. .sctn.282, Mar. 4, 2011(NPL22)).

ElGamal, Taher. A Public Key Cryptosystem and a Signature Scheme Based on Discrete Logarithms, pp. 469-472, IEEE, Transactions on Information Theory, vol. IT-31, No. 4, (Jul. 1985).

ElGamal, Taher. A Subexponential Time Algorithm for Computing Discrete Logarithms, pp. 473-481, IEEE, Transactions on Information Theory, vol. IT-31, No. 4, (Jul. 1985).

Examination Report Under Section 18(3) for GB0502236.3 dated May 23, 2005.

Feistel, Horst, Notz, Wm. A. and Smith, J. Lynn. Some Cryptographic Techniques for Machine-to-Machine Data Communications, pp. 1545-1554, Proceedings of the IEEE, vol. 63, No. 11, (Nov. 1975).

Feistel, Horst. 'Cryptography and Computer Privacy', pp. 15-23, Scientific American, vol. 228, No. 5, May 1973.

Fenzl, H. and Kliner, A. Electronic Lock System: Convenient and Safe, pp. 150-153, Siemens Components XXI, No. 4, (1987).

U.S. District Court, Northern District of Illinois, Eastern Division, Civil Action No. 05-CV-3449, Memorandum Opinion and Order, Sep. 11, 2006.

U.S. District Court, Northern District of Illinois, Eastern Division, Civil Action No. 05-CV-3449, Memorandum Opinion and Order; Mar. 30, 2007.

U.S. District Court, Northern District of Illinois, Eastern Division, Civil Action No. 05-CV-3449, Notice of Motion and Motion for Leave to File Defendant Lear Corporation's Sur-Reply to Chamberlain's and JCI's Reply Memorandum in Support of Motion for Preliminary Injunction; Mar. 30, 2006.

U.S. District Court, Northern District of Illinois, Eastern Division, Civil Action No. 05-CV-3449, Plaintiffs' Opposition to Lear Corporation's Motion to Stay the Effectiveness of the Preliminary Injunction Memorandum Opinion and Order Entered Mar. 30, 2007.

U.S. District Court, Northern District of Illinois, Eastern Division, Civil Action No. 05-CV-3449, Plaintiffs' Response to Lear's Mar. 2, 2007 Supplemental Memorandum.

U.S. District Court, Northern District of Illinois, Eastern Division, Civil Action No. 05-CV-3449, Plaintiffs' Response to Lear's Motion for Reconsideration of the Court's Sep. 11, 2006 Ruling Regarding Claim Construction; Oct. 4, 2006.

U.S. District Court, Northern District of Illinois, Eastern Division, Civil Action No. 05-CV-3449, Plaintiffs' Surreply Memorandum in Opposition to Lear's Motion to Stay the Preliminary Injunction, Apr. 24, 2007.

U.S. District Court, Northern District of Illinois, Eastern Division, Civil Action No. 05-CV-3449, Plaintiffs' Surreply Memorandum in Support of Motion for Preliminary Injunction.

U.S. District Court, Northern District of Illinois, Eastern Division, Civil Action No. 05-CV-3449, Reply Brief in Support of Lear's Motion for Reconsideration of the Court's Sep. 11, 2006 Ruling Regarding Claim Construction.

U.S. District Court, Northern District of Illinois, Eastern Division, Civil Action No. 05-CV-3449, Supplemental Memorandum in Support of Defendant Lear Corporation's Opposition to Plaintiffs' Motion for Preliminary Injunction; Mar. 2, 2007.

U.S. District Court, Northern District of Illinois, Eastern Division, Civil Action No. 05-CV-3449, Transcript of Deposition of Bradford L. Farris, Jan. 12, 2006.

U.S. District Court, Northern District of Illinois, Eastern Division, Civil Action No. 05-Cv-3449, Transcript of Deposition of Hubert E Dunsmore, Jan. 12, 2006.

U.S. District Court, Northern District of Illinois, Eastern Division, Civil Action No. 05-CV-3449, Transcript of Proceedings Before the Honorable James B. Moran, May 31, 2005.

U.S. District Court, Northern District of Illinois, Eastern Division, Civil Action No. 05-CV-3449, Transcript of Proceedings Before the Honorable James B. Moran, May 31, 2006.

United States Court of Appeals for the Federal Circuit, Appeal from the United States District Court for the Northern District of Illinois in Case No. 05-CV-3449, Brief of Defendant-Appellant Lear Corporation.

(56) References Cited

OTHER PUBLICATIONS

United States Court of Appeals for the Federal Circuit, Appeal from the United States District Court for the Northern District of Illinois in Case No. 05-CV-3449, Brief of the Chamberlain Group, Inc. and Johnson Controls Interiors LLC; Aug. 8, 2007.

United States Court of Appeals for the Federal Circuit, Appeal from the United States District Court for the Northern District of Illinois in Case No. 05-CV-3449, Combined Petition for Panel Rehearing and Rehearing En Banc of Chamberlain Group, Inc. and Johnson Controls Interiors LLC; Dated Mar. 19, 2008.

United States Court of Appeals for the Federal Circuit, Appeal from the United States District Court for the Northern District of Illinois in Case No. 05-CV-3449, Reply Brief of Defendant-Appellant Lear Corporation, Aug. 29, 2007.

United States Court of Appeals for the Federal Circuit, Appeal from the United States District Court, Northern District of Ilinois in Case No. 05-CV-3449, Appellate Decision, Feb. 19, 2008.

United States Court, Northern District of Illinois, Eastern Division, Civil Action 05 C 3449, Notice Pursuant to 35 U.S.C. 282, Mar. 4, 2011.

United States International Trade Commission in the Matter of Certain Code Hopping Remote Control Systems, Including Components and Integrated Circuits Used Therein; Investigation No. 337-TA-417; Expert Report of Dr. V. Thomas Rhyne; (TCG019919-19959); Partially redacted; Dated Jul. 7, 1999.

United States International Trade Commission, Washington, D., Investigation No. 337-TA-417; Respondents' Answer to Complaint and Notice of Investigation, Jan. 26, 1999.

Voydock, Victor L. and Kent, Stephen T. 'Security in High-Level Network Protocols', IEEE Communications Magazine, pp. 12-25, vol. 23, No. 7, Jul. 1985.

Voydock, Victor L. and Kent, Stephen T. 'Security Mechanisms in High-Level Network Protocols', Computing Surveys, pp. 135-171, vol. 15, No. 2, Jun. 1983.

Voydock, Victor L. and Kent, Stephen T. Security Mechanisms in a Transport Layer Protocol, pp. 325-341, Computers & Security, (1985).

Watts, Charles and Harper John. How to Design a HiSec.TM. Transmitter, pp. 1-4, National Semiconductor, (Oct. 1994).

Weinstein, S.B. Smart Credit Cards: The Answer to Cashless Shopping, pp. 43-49, IEEE Spectrum, (Feb. 1984).

Weissman, C. Securtiy Controls in the ADEPT-50 Time-Sharing Syustem, pp. 119-133, AFIPS Full Joint Compuer Conference, (1969).

Welsh, Dominic, Codes and Cryptography, pp. 7.0-7.1, (Clarendon Press, 1988).

Wolfe, James Raymond, "Secret Writing—The Craft of the Cryptographer" McGraw-Hill Book Company 1970, pp. 111-122, Chapter 10.

Fischer, Elliot. Uncaging the Hagelin Cryptograph, pp. 89-92, Cryptologia, vol. 7, No. 1, (Jan. 1983).

Fragano, Maurizio. Solid State Key/Lock Security System, pp. 604-607, IEEE Transactions on Consumer Electronics, vol. CE-30, No. 4, (Nov. 1984).

G. Davis, Marcstar.TM. TRC1300 and TRC1315 Remote Control Transmitter/Receiver, Texas Instruments, Sep. 12, 1994. 1-24.

German Patent Application No. 10 2006 003 808.8; Official Action dated Feb. 14, 2019 (with translation of relevant parts); 6 pages.

Godlewski, Ph and Camion P. 'Manipulations and Errors, Delection and Localization,' pp. 97-106, Proceedings of Eurocrypt 88, 1988.

Gordon, Professor J., Police Scientific Development Branch, Designing Codes for Vehicle Remote Security Systems, (Oct. 1994), pp. 1-20.

Gordon, Professor J., Police Scientific Development Branch, Designing Rolling Codes for Vehicle Remote Security Systems, (Aug. 1993), pp. 1-19.

Greenlee, B.M., Requirements for Key Management Protocols in the Wholesale Financial Services Industry, pp. 22 28, IEEE Communications Magazine, Sep. 1985.

Guillou, Louis C. and Quisquater, Jean-Jacques. 'A Practical Zero-Knowledge Protocol Fitted to Security Microprocessor Minimizing Both Transmission and Memory', pp. 123-128, Advances in Cryptology-Eurocrypt 88, 1988.

Guillou, Louis C. Smart Cards and Conditional Access, pp. 481-489, Proceedings of Eurocrypt, (1984).

Habermann, A. Nico, Synchronization of Communicating Processes, pp. 171 176, Communications, Mar. 1972.

Haykin, Simon, "An Introduction to Analog and Digital Communications" 213, 215 (1989).

IEEE 100; The Authoritative Dictionary of IEEE Standards Terms, Seventh Ediciton, Published by Standards Information Network, IEEE Press, Copyright 2000.

International Search Report for PCT/US03/25308 dated Mar. 25, 2004.

ISO 8732: 1988(E): Banking Key Management (Wholesale) Annex D: Windows and Windows Management, Nov. 1988.

ITC Tutorial; Investigation No. 337-TA-417; (TCG024374-24434); Dated: Jul. 7, 1999.

Jones, Anita K. Protection Mechanisms and the Enforcement of Security Policies, pp. 228-251, Carnegie-Mellon University, Pittsburgh, PA, (1978).

Jueneman, R.R. et al. 'Message Authentication', pp. 29-40, IEEE Communications Magazine, vol. 23, No. 9, Sep. 1985.

Kahn, Robert E. The Organization of Computer Resources Into a Packet Radio Network, pp. 177-186, National Computer Conference, (1975).

Keeloq.RTM. Code Hopping Decoder, HCS500, 1997 Microchip Technology, Inc., 1-25.

Keeloq.RTM. Code Hopping Encoder, HCS300, 1996 Microchip Technology, Inc., 1-20.

Keeloq.RTM. NTQ 105 Code Hopping Encoder, pp. 1-8, Nanoteq (Pty.) Ltd., (Jul. 1993).

Keeloq.RTM. NTQ 125D Code Hopping Decoder, pp. 1-9, Nanoteq (pty.) Ltd., (Jul. 1993).

Kent, Stephen T. A Comparison of Some Aspects of Public-Key and Conventional Cryptosystems, pp. 4.3.1-5, ICC '79 Int. Conf. on Communications, Boston, MA, (Jun. 1979).

Kent, Stephen T. Comments on 'Security Problems in the TCP/IP Protocol Suite', pp. 10-19, Computer Communication Review, vol. 19, Part 3, (Jul. 1989).

Kent, Stephen T. Encryption-Based Protection Protocols for Interactive User-Computer Communication, pp. 1-121, (May 1976). (See pp. 50-53).

Kent, Stephen T. Protocol Design Consideration for Network Security, pp. 239-259, Proc. NATO Advanced Study Institute on Interlinking of Computer Networks, (1979).

Kent, Stephen T. Security Requirements and Protocols for a Broadcast Scenario, pp. 778-786, IEEE Transactions on Communications, vol. com-29, No. 6, (Jun. 1981).

Kent, Stephen T., et al. Personal Authorization System for Access Control to the Defense Data Network, pp. 89-93, Conf. Record of Eascon 82 15.sup.th Ann Electronics & Aerospace Systems Conf., Washington, D.C. (Sep. 1982).

Konheim, A.G. Cryptography: A Primer, pp. 285-347, New York, (John Wiley, 1981).

Koren, Israel, "Computer Arithmetic Algorithms" Prentice Hall, 1978, pp. 1-15.

Kruh, Louis. Device anc Machines: The Hagelin Cryptographer, Type C-52, pp. 78-82, Cryptologia, vol. 3, No. 2, (Apr. 1979).

Kruh, Louis. How to Use the German Enigma Cipher Machine: A photographic Essay, pp. 291-296, Cryptologia, vol. No. 7, No. 4 (Oct. 1983).

Kuhn, G.J., et al. A Versatile High-Speed Encryption Chip, INFOSEC '90 Symposium, Pretoria, (Mar. 16, 1990).

Kuhn. G.J. Algorithms for Self-Synchronizing Ciphers, pp. 159-164, Comsig 88, University of Pretoria, Pretoria, (1988).

Lamport, Leslie. The Synchronization of Independent Processes, pp. 15-34, Acta Informatica, vol. 7, (1976).

Lear Corporation's Memorandum of Law in Support of Its Motion for Summary Judgment; May 22, 2008.

(56) References Cited

OTHER PUBLICATIONS

Linn, John and Kent, Stephen T. Electronic Mail Privacy Enhancement, pp. 40-43, American Institute of Aeronautics and Astronautics, Inc. (1986).
Lloyd, Sheelagh. Counting Functions Satisfying a Higher Order Strict Avalanche Criterion, pp. 63-74, (1990).
Marneweck, Kobus. Guidelines for KeeLoq.RTM. Secure Learning Implementation, TB007, pp. 1-5, 1987 Microchip Technology, Inc.
McIvor, Robert. Smart Cards, pp. 152-159, Scientific American, vol. 253, No. 5, (Nov. 1985).
Meier, Willi. Fast Correlations Attacks on Stream Ciphers (Extended Abstract), pp. 301-314, Eurocrypt 88, IEEE, (1988).
Meyer, Carl H. and Matyas Stephen H. Cryptography: A New Dimension in Computer Data Security, pp. 237-249 (1982).
Michener, J.R. The 'Generalized Rotor' Cryptographic Operator and Some of Its Applications, pp. 97-113, Cryptologia, vol. 9, No. 2, (Apr. 1985).
Microchip Technology, Inc., Enhanced Flash Microcontrollers with 10-Bit A/D and nano Watt Technology, PIC18F2525/2620/4525/4620 Data Sheet, 28/40/44-Pin, .COPYRGT.2008.
*Microchip v. The Chamberlain Group, Inc.*, (TCG019794-019873); Deposition of J. Fitzgibbon; Partially redacted; Dated: Jan. 7, 1999.
*Microchip v. The Chamberlain Group, Inc.*, (TCG019874-019918); Deposition of J. Fitzgibbon; Dated: Mar. 16, 1999.
*Microchip v. The Chamberlain Group, Inc.*, Civil Action No. 98-C-6138; (TCG024334-24357); Declaration of V. Thomas Rhyne; Dated: Feb. 22, 1999.
MM57HS01 HiSeC.TM. Fixed and Rolling Code Decoder, National Semiconductor, Nov. 11, 1994, 1-8.
Morris, Robert. The Hagelin Cipher Machine (M-209): Reconstruction of the Internal Settings, pp. 267-289, Cryptologia, 2(3), (Jul. 1978).
Newman, David B., Jr., et al. 'Public Key Management for Network Security', pp. 11-16, IEE Network Magazine, 1987.
Nickels, Hamilton, 'Secrets of Making and Breading Codes' Paladin Press, 1990, pp. 11-29.
Niederreiter, Harald. Keystream Sequences with a Good Linear Complexity Profile for Every Starting Point, pp. 523-532, Proceedings of Eurocrypt 89, (1989).
NM95HSO1/NM95HSO2 HiSeC.TM. (High Security Code) Generator, pp. 1-19, National Semiconductor, (Jan. 1995).
Otway, Dave and Rees, Owen. Efficient and timely mutual authentication, ACM SIGOPS Operating Systems Review, vol. 21, Issue 1, Jan. 8-10, 1987.
Peebles, Jr., Peyton Z. and Giuma, Tayeb A.; "Principles of Electrical Engineering" McGraw Hill, Inc., 1991, pp. 562-597.
Peyret, Patrice, et al. Smart Cards Provide Very High Security and Flexibility in Subscribers Management, pp. 744-752, IEE Transactions on Consumer Electronics, 36(3), (Aug. 1990).
Postel, J. ed. 'DOD Standard Transmission Control Protocol', pp. 52-133, Jan. 1980.
Postel, Jonathon B., et al. The ARPA Internet Protocol, pp. 261-271, (1981).
Reed, David P. and Kanodia, Rajendra K. Synchronization with Eventcounts and Sequencers, pp. 115-123, Communications of the ACM, vol. 22, No. 2, (Feb. 1979).
Reynolds, J. and Postel, J. Official ARPA-Internet Protocols, Network Working Groups, (Apr. 1985).
Roden, Martin S., "Analog and Digital Communication Systems," Third Edition, Prentice Hall, 1979, pp. 282-460.
Ruffell, J. Battery Low Indicator, p. 15-165, Eleckton Electronics, (Mar. 1989). (See p. 59).
Saab Anti-Theft System: 'Saab's Engine Immobilizing Anti-Theft System is a Road-Block for 'Code-Grabbing' Thieves', pp. 1-2, Aug. 1996; http://www.saabusa.com/news/newsindex/alarm.html.
Savage. J.E. Some Simple Self-Synchronizing Digital Data Scramblers, pp. 449-498, The Bell System Tech. Journal, (Feb. 1967).
Schedule of Confidential Non-Patent Literature Documents; Apr. 1, 2008.

Seberry, J. and Pieprzyk, Cryptography—An Introduction to Computer Security, Prentice Hall of Australia, YTY Ltd, 1989, pp. 134-136.
Secure Terminal Interface Module for Smart Card Application, pp. 1488-1489, IBM: Technical Disclosure Bulletin, vol. 28, No. 4, (Sep. 1985).
Shamir, Adi. 'Embedding Cryptographic Trapdoors in Arbitrary Knapsack Systems', pp. 77-79, Information Processing Letters, 1983.
Shamir, Adi. Embedding cryptographic Trapdoors in Arbitrary Knapsak Systems, pp. 81-85, IEEE Transactions on Computers, vol. C-34, No. 1, (Jan. 1985).
Siegenthaler, T. Decrypting a Class of Stream Ciphers Using Ciphertext Only, pp. 81-85, IEEE Transactions on computers, vol. C-34, No. 1, (Jan. 1985).
Simmons, Gustavus, J. Message Authentication with Arbitration of Transmitter/Receiver Disputes, pp. 151-165 (1987).
Smith, J.L., et al. An Experimental Application of Crptography to a Remotely Accessed Data System, pp. 282-297, Proceedings of hte ACM, (Aug. 1972).
Smith, Jack, 'Modem Communication Circuits.' McGraw-Hill Book Company, 1986, Chapter 11, pp. 420-454.
Smith, Jack, 'Modem Communication Circuits' McGraw-Hill Book Company, 1986, Chapter 7, pp. 231-294.
Smith. J.L. The Design of Lucifer: a Cryptographic Device for Data Communications, pp. 1-65, (Apr. 15, 1971).
Soete, M. Some constructions for authentication—secrecy codes, Advances in Cryptology—Eurocrypt '88, Lecture Notes in Computer Science 303 (1988), 57-75.
Steven Dawson, Keeloq.RTM. Code Hopping Decoder Using Secure Learn, AN662, 1997 Microchip Technology, Inc., 1-16.
Svigals, J. Limiting Access to Data in an Indentification Card Having a Micro-Processor, pp. 580-581, IBM: Technical Disclosre Bulletin, vol. 27, No. 1B, (Jun. 1984).
Thatcham: The Motor Insurance Repair Research Centre, The British Insurance Industry's Criteria for Vehicle Security (Jan. 1993) (Lear 18968-19027), pp. 1-36.
Transaction Completion Code Based on Digital Signatures, pp. 1109-1122, IBM: Technical Disclosure Bulletin, vol. 28, No. 3, (Aug. 1985).
Turn, Rein. Privacy Transformations for Databank Systems, pp. 589-601, National Computer Conference, (1973).
U.S. District Court, Northern District of Illinois, Eastern Division, Civil Action No. 05-C-3449, Declaration of Robert Louis Stevenson, Jr., Jun. 26, 2009.
U.S. District Court, Northern District of Illinois, Eastern Division, Civil Action No. 05-C-3449, JCI's Local Rule 56.1 Statement of Undisputed Facts in Support of Their Motion for Summary Judgment of Infringement of the '056 Patent; Jul. 6, 2009.
U.S. District Court, Northern District of Illinois, Eastern Division, Civil Action No. 05-C-3449, JCI's Local Rule 56.1 Statement of Undisputed Facts in Support of Their Motion for Summary Judgment of Infringement of the '544 Patent; Jul. 6, 2009.
U.S. District Court, Northern District of Illinois, Eastern Division, Civil Action No. 05-C-3449, JCI's Memorandum of Law in Support of its Motion for Summary Judgment of Infringement of the '056 Patent, Jul. 6, 2009.
U.S. District Court, Northern District of Illinois, Eastern Division, Civil Action No. 05-C-3449, JCI's Memorandum of Law in Support of its Motion for Summary Judgment of Infringement of the '544 Patent, Jul. 6, 2009.
U.S. District Court, Northern District of Illinois, Eastern Division, Civil Action No. 05-C-3449, JCI's Memorandum Opinion and order, Nov. 24, 2010.
U.S. District Court, Northern District of Illinois, Eastern Division, Civil Action No. 05-CV-3449, Defendant Lear Corporation's Answer to Plaintiffs' Second Amended Complaint, Defenses, and Counterclaim; Sep. 8, 2008.
U.S. District Court, Northern District of Illinois, Eastern Division, Civil Action No. 05-CV-3449, Defendant Lear Corporation's Reply Memorandum in Support of Its Motion to Stay Effectiveness of Any Preliminary Injunction; Apr. 17, 2007.

(56) References Cited

OTHER PUBLICATIONS

U.S. District Court, Northern District of Illinois, Eastern Division, Civil Action No. 05-CV-3449, Lear Corporation Memorandum of Law in Support of Its Motion for Summary Judgment of U.S. Pat. No. 7,412,056; Dec. 8, 2008.

U.S. District Court, Northern District of Illinois, Eastern Division, Civil Action No. 05-CV-3449, Lear Corporation's Answer, Affirmative Defenses and Counterclaims to Plaintiffs' Amended Complaint; Oct. 24, 2005.

U.S. District Court, Northern District of Illinois, Eastern Division, Civil Action No. 05-CV-3449, Lear Corporation's Memorandum of Law in Support of Its Emergency Motion to Stay the Effectiveness of the Preliminary Injunction Memorandum Opinion and Order Entered Mar. 30, 2007.

U.S. District Court, Northern District of Illinois, Eastern Division, Civil Action No. 05-CV-3449, Lear Corporation's Memorandum of Law in Support of Its Motion for Summary Judgment, May 22, 2008.

U.S. District Court, Northern District of Illinois, Eastern Division, Civil Action No. 05-CV-3449, Lear Corporation's Motion for Reconsideration of the Court's Sep. 11, 2006 Memorandum Opinion and Order Regarding Claim Construction.

U.S. District Court, Northern District of Illinois, Eastern Division, Civil Action No. 05-CV-3449, Memorandum Opinion and Order, Apr. 25, 2007.

U.S. District Court, Northern District of Illinois, Eastern Division, Civil Action No. 05-CV-3449, Memorandum Opinion and Order, Feb. 20, 2007.

German Patent Application No. 10 2007 036 647.9; Official Communication dated Jul. 4, 2019, 4 pages.

German Patent Application No. 10 2006 063 085.8; Official Action dated Nov. 7, 2019 (with translation of relevant parts); 14 pages.

German Patent Application No. 10 2006 003 808.3; Official Action dated May 16, 2018; 6 pages.

Access Transmitters-Access Security System', pp. 1-2, Dated Jul. 16, 1997. htpp://www.webercreations.com/access/ security.html.

Beutelspacher, Albrecht. Advances in Cryptology—Eurocrypt 87: 'Perfect and Essentially Perfect Authentication Schemes' (Extended Abstract), pp. 167-170, Federal Republic of Germany, believed to be publicly available prior to Jun. 30, 2004.

Dijkstra, E. W. Co-Operating Sequential Processses, pp. 43-112, Programming Languages, F. Genuys. NY, believed to be publicly available prior to Jun. 30, 2004.

Dijkstra, E.W. 'Hierarchical Ordering of Sequential Processes', pp. 115-138, Acta Informatica 1: 115-138, Springer-Verlag (1971).

Hagelin C-35/C-36 (The), (1 page) Sep. 3, 1998. http://hem.passagen.se/tan01/C035.HTML.

Massey, James L. The Difficulty with Difficulty, pp. 1-4, Jul. 17, 1996. http://www.iacr.org/conferences/ec96/massey/html/framemassey.html.

U.S. District Court, Northern District of Illinois, Eastern Division, Civil Action No. 05-CV-3449, Lear Corporation's Post-Markman Brief; Dated Jun. 15, 2006.

U.S. Appl. No. 15/674,069; Office Action dated May 8, 2020, (pp. 1-9).

First Examination Report, from Australian Application No. 2019240615, dated Aug. 13, 2020; 4 pages.

U.S. Appl. No. 15/674,069; Notice of Allowance dated Sep. 30, 2020; (pp. 1-12)

\* cited by examiner

METHOD AND APPARATUS TO FACILITATE MESSAGE TRANSMISSION AND RECEPTION USING DIFFERENT TRANSMISSION CHARACTERISTICS

RELATED APPLICATION

This is a continuation of U.S. patent application Ser. No. 11/172,525, filed Jun. 30, 2005, entitled, "Method and apparatus to facilitate message transmission and reception using different transmission characteristics," which is incorporated by reference in its entirety.

TECHNICAL FIELD

This invention relates generally to message transmission and reception techniques and more particularly to the relatively secure conveyance of message contents.

BACKGROUND

Various means of conveying messages are known in the art. In many cases an interest exists in preserving or otherwise maintaining at least some degree of security with respect to conveyance of the message. For example, in some cases it may be desired to prevent an eavesdropping party from gleaning the substantive content of the message. In other cases, as when the message comprises, at least in part, an instruction, command, or similar content it may be desirable to prevent an unauthorized party from effectively transmitting an unauthorized message in order to prevent instigation of unauthorized action by the receiving entity.

For example, movable barrier operators (such as but not limited to garage door openers) often respond to receipt of a wireless remote control signal. In particular, the movable barrier operator will often move a corresponding movable barrier between closed and opened positions in response to such remote control signals. In such a case it often behooves the system operator to seek to ensure that the movable barrier operator will not respond to a remote control signal when transmitted from an unauthorized transmission source.

In some cases the movable barrier operator expects to see a unique identifier or other code in conjunction with, or in lieu of, a specific remote control command. This approach provides at least some degree of security though a more sophisticated unauthorized party may be able to themselves receive such a transmission and co-opt the identifier/code for their own future unauthorized use. With this in mind, so-called rolling codes are often employed to frustrate this approach to breaching the security of such a system. With rolling codes, the code itself changes on a frequent basis pursuant to a plan (such as an implementing algorithm) known to both the transmitter and the receiver. Without knowledge of the underlying scheme by which a next code is selected, an unauthorized party who gains access to a presently used code or identifier will still remain unable to leverage that knowledge in support of effecting unauthorized control over the receiver.

There may be instances, however, when additional security may be desired or appropriate. For example, a given rolling code instantiation may be open to brute force attacks or other weaknesses due to local and/or otherwise unique circumstances.

BRIEF DESCRIPTION OF THE DRAWINGS

The above needs are at least partially met through provision of the method and apparatus to facilitate message transmission and reception using different transmission characteristics described in the following detailed description, particularly when studied in conjunction with the drawings, wherein.

Figure 1:
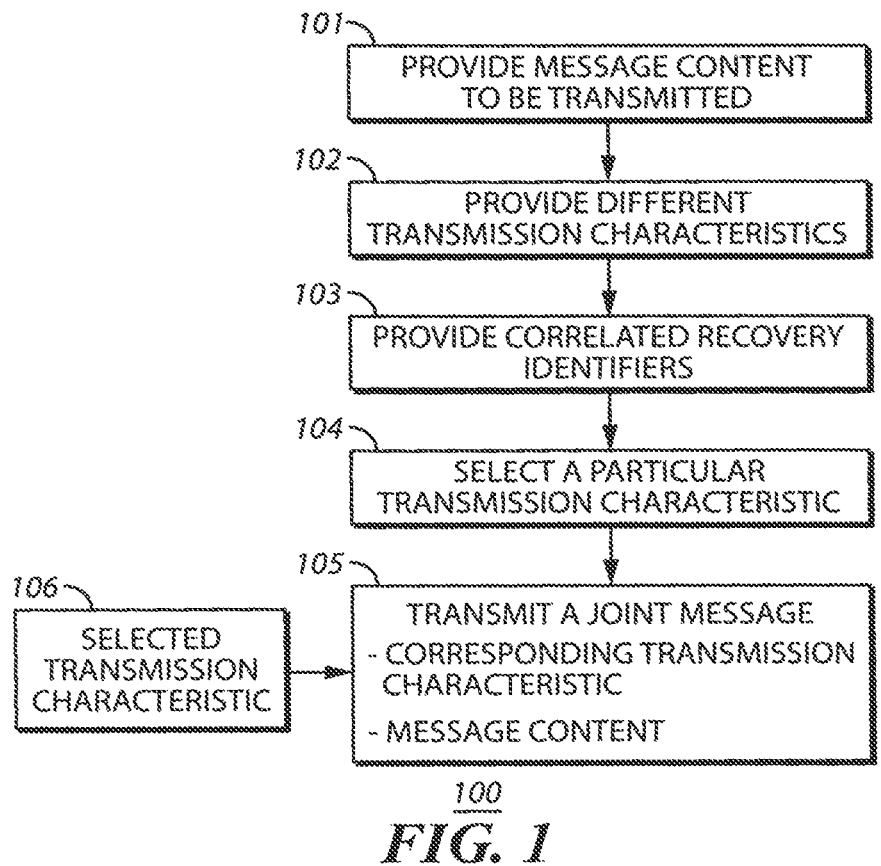
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a plurality of different transmission characteristics as each corresponds, for example, to various selectable types of transmission techniques or means. When message content exists to be transmitted (such as, but not limited to, a remote control signal) a particular one of the transmission characteristics is selected and a corresponding recovery identifier that correlates to the selected transmission characteristic is selected as well. One then transmits a joint message comprising both the message content as is transmitted using the selected transmission characteristic and the recovery identifier as uniquely corresponds to the selected transmission characteristic.

Upon reception of the recovery identifier, and pursuant to a preferred approach, a particular way of receiving the transmission of the message content portion of the joint message is selected as a function thereof and then used to facilitate reception of that message content portion.

The joint message can assume any of a wide variety of forms. For example, depending upon needs and/or requirements, the joint message can comprise a single contiguous message or can comprise a plurality of discrete transmissions. The recovery identifier and the message content can be discrete with respect to one another or can, if desired, be at least partially integrated with one another.

These teachings are usable with a wide variety of different transmission characteristics and hence can provide benefits with a large number of platforms having transmission/reception agility of various kinds. It will also be seen that these teachings can be employed in conjunction with more traditional identifier/code based techniques including specifically rolling code-based techniques. So configured, security can be increased and often dramatically so. In particular, an unauthorized party will face increased difficulty with respect to viably monitoring the communications of such a system. An unauthorized party will also likely face increased difficulty with respect to accommodating and matching the transmission/reception agility of the resultant system.

These and other benefits may become clearer upon making a thorough review and study of the following detailed description. Referring now to the drawings, and in particular to FIG. 1, an exemplary process 100 provides 101 message content to be transmitted (for example, from a wireless remote control device to a movable barrier operator where the message content comprises remote control signaling, an identifier for at least one of the transmitting platform, the receiving platform, the communication system to which one or more of these elements belongs, and/or a particular communication system user (such as an individual, a particular group of individuals, a business, or some other entity of interest)). In accordance with prior art practice this message content can also comprise, if desired, one or more rolling codes. Those skilled in the art will also understand that this message content can be encrypted, or not, in accordance with the needs and/or requirements of a given application setting.

This process 100 also provides for provision 102 of a plurality of different transmission characteristics. These transmission characteristics pertain to different types of transmission. Relevant examples comprise, but are not limited to:

a plurality of candidate data rates;
a plurality of candidate spread spectrum practices (including but not limited to various spreading codes, frequency hopping patterns and/or usable (or unusable) channels, and so forth);
a plurality of candidate carrier modulations (including but not limited to frequency modulation, amplitude modulation, phase modulation, direct sequencing spread spectrum, frequency hopping spread spectrum, single sideband, vestigial sideband, and so forth);
a plurality of candidate carrier frequencies (including but not limited to specific center frequencies and corresponding information such as, but not limited to, channel width, guard band presence and/or width, and so forth);
a plurality of candidate joint message formats (including but not limited to integral formats, parsed formats, and so forth as will be described below in more detail);
a plurality of candidate data orders (where, for example, the order is changed for all remaining portions of the message, only a portion of the remaining message, or follows a pattern per message position);
a plurality of candidate data inversion patterns (where, for example, the inversion can be for the rest of the message, for a portion of the message, and/or follows a pattern per message position);
a plurality of candidate data symbols representing a data value (where, for example, the representation is modified for the whole message, a specific portion of the message, and/or follows a pattern per message position).

In a similar fashion this process 100 then further provides 103 for a correlated (or at least partially correlated) plurality of recovery identifiers (where, for example, a given recovery identifier correlates to and therefore essentially serves to identify a specific one of the transmission characteristics as was provided above). Accordingly, it will be understood that these recovery identifiers can comprise, but are not limited to:

particular data rate identifiers;
particular spread spectrum practice identifiers;
particular carrier modulation identifiers;
particular carrier frequency identifiers;
particular joint message format identifiers;
particular data order identifiers;
particular data inversion pattern identifiers;
particular symbol pattern identifiers;
and so forth, to name but a few.

The recovery identifier can comprise, for example, a simple code where a specific value, such as a binary value, corresponds to a particular transmission characteristic. As a simplified example, when only two transmission characteristics are provided then a one-bit value will serve to identify these transmission characteristics. To illustrate, a value of "0" can correlate to a first transmission characteristic while a value of "1" can correlate to the second transmission characteristic. It would be possible, for example, for each recovery identifier to essentially point to a specific entry in a lookup table, where the specific entry itself defines the corresponding transmission characteristic.

If desired, the recovery identifier can share functionality and meaning in support of other content or capability. As an illustration, all or part of a rolling code can also serve as a recovery identifier. For example, and to continue the simple example presented above, the least significant bit of a rolling code can also serve to identify each of two provided transmission characteristics.

Pursuant to this process 100, one then selects 104 a particular one of the different transmission characteristics to thereby provide a selected transmission characteristic. This selection step 104 can be carried out in any of a wide variety of ways with a specific approach likely being dictated by the needs and/or limitations inherent to a given application context. As one example, the particular transmission characteristic can be selected essentially at random. As another example the particular transmission characteristic can be selected pursuant to a pre-selected selection pattern. The selection itself can be the result of a specific selection process or can be a part of another process (as when the particular transmission characteristic selected is dependent upon the least significant bit (or bits) of a rolling code as is derived via its own derivation process).

This process 100 then facilitates the transmission 105 of a joint message that comprises at least the recovery identifier as uniquely corresponds to the selected transmission characteristic and the previously provided message content. In a preferred approach, at least the message content portion of the joint message is transmitted using the selected transmission characteristic 106.

Figure 2:
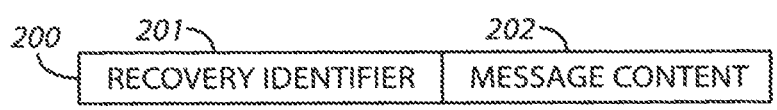
FIG. 2 comprises a schematic view of a data format as configured in accordance with various embodiments of the invention.
Figure 3:
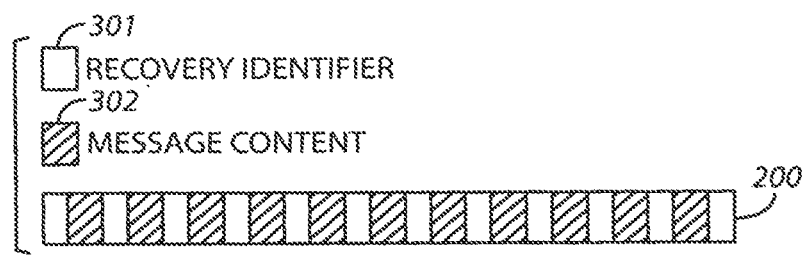
FIG. 3 comprises a schematic view of a data format as configured in accordance with various embodiments of the invention.

There are various useful ways to deploy these teachings. For example, and referring now to FIG. 2, a given joint message 200 can comprise a first portion (such as a first field) that comprises the recovery identifier 201 and a second portion (such as a second field) that comprises the message content 202 where the first and second portion comprise an essentially continuous aggregation of the recovery identifier 201 and the message content 202. When so aggregated, if desired, the two portions or fields can be essentially discrete from one another as suggested by the schematic illustration provided in FIG. 2. If desired, however, these portions can be interleaved with one another as is suggested and shown in FIG. 3. In this illustrative example, small portions comprising parts of the recovery identifier 301 and the message content 302 are interleaved with one another. This interleaving can comprise a symmetrical pattern (as is suggested by the illustration provided) or can be effected using any other pattern or interleaving criteria of choice.

Figure 4:
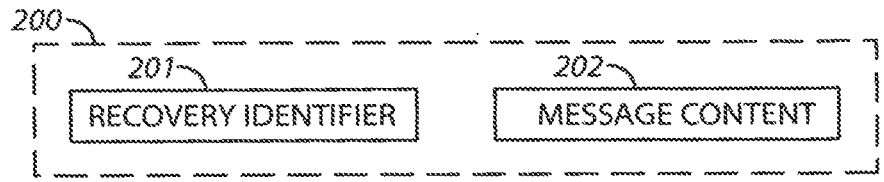
FIG. 4 comprises a schematic view of a data format as configured in accordance with various embodiments of the invention.

In the illustrative examples provided above, the recovery identifier and the message content are aggregated with one another. It is also possible, however, for the joint message 200 to comprise a plurality of discrete messages as is suggested by the schematic depiction of FIG. 4. In this example the recovery identifier 201 is separate and distinct from the message content 202. The nature of this separation can vary with the needs and/or limitations of a given application setting. Useful examples include, but are not limited to, separation by time (as when the individual joint message portions are sent at considerably different times), carrier characteristics (as when the individual joint message portions are sent using different transmission characteristics as pertain to the carrier), specific bit patterns, and/or a specific quantity of bits.

Figure 5:
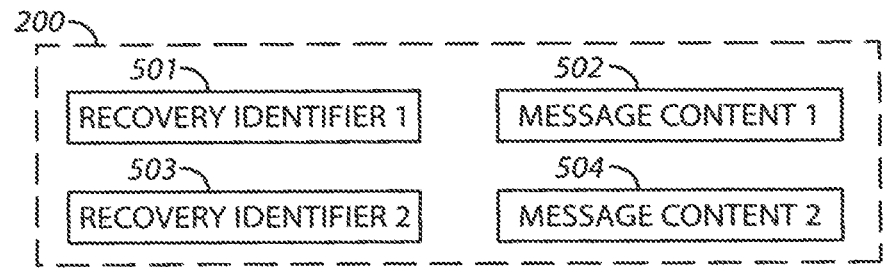
FIG. 5 comprises a schematic view of a data format as configured in accordance with various embodiments of the invention.

The approaches described above can be further parsed and combined in various ways if desired. As but one illustration of many possibilities, and referring now to FIG. 5, the message content can itself be parsed into a first message content portion 502 and a second message content portion 504. In turn, the first message content portion 502 can be sent using a first corresponding transmission characteristic that is identified by a corresponding first recovery identifier 501 and the second message content portion 504 can be sent using a second corresponding transmission characteristic that is identified by a corresponding second recovery identifier 503. These various informational elements can, in turn, be aggregated or separated as described above to form the corresponding joint message 200.

Figure 6:
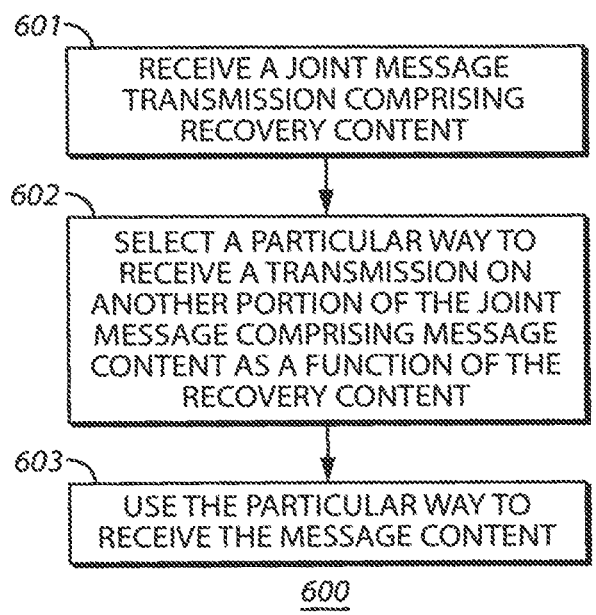
FIG. 6 comprises a flow diagram as configured in accordance with various embodiments of the invention.

Referring now to FIG. 6, a corresponding receive process 600 preferably begins with reception 601 of a joint message (such as those described above) comprising, at least in part, the recovery content (that is, reception of the recovery content portion (or at least a portion thereof) may precede reception of at least part of the message content portion in order to enable use of the recovery content portion to facilitate proper reception of that message content portion). This process 600 then facilitates selection 602 of a particular way of receiving a transmission of another portion of that joint message (which portion comprises, for example, at least a portion of the message content).

In a preferred approach this selection 602 occurs as a function, at least in part, of the recovery content as has already been received. To illustrate, when the recovery content comprises data that correlates to a first transmission characteristic (as was described above) then a way of receiving as corresponds to that first transmission characteristic can be selected. Similarly, when the recovery content comprises data that correlates to a second transmission characteristic then another way of receiving, which corresponds to that second transmission characteristic, can be selected. This process 600 then uses 603 that selected particular way of receiving to facilitate proper reception of that portion of the joint message as comprises at least a portion of the message content.

Figure 7:
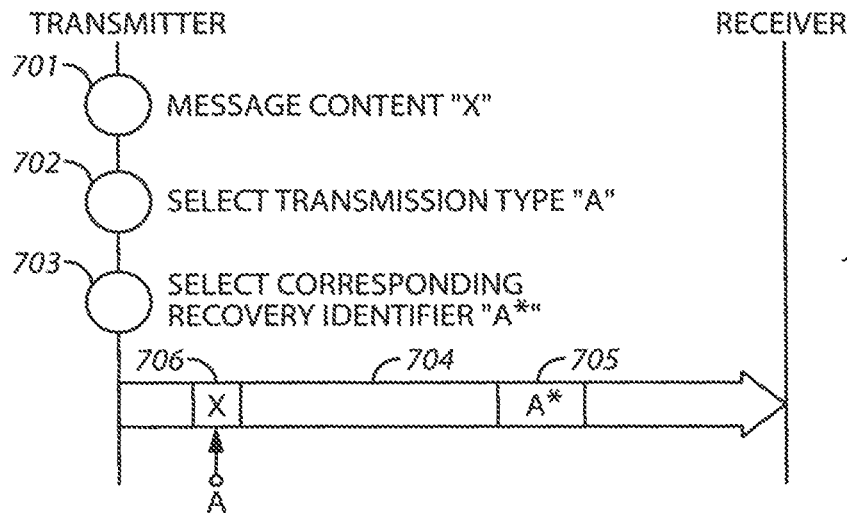
FIG. 7 comprises a call flow diagram as configured in accordance with various embodiments of the invention.

FIG. 7 illustrates one way by which these teachings can be employed. In this illustrative example, a transmitter develops (or otherwise detects a need to transmit already available) message content that is denoted here by the letter "X." 701. In this example, the transmitter then selects a particular transmission type 702 (denoted here by the letter "A") and the recovery identifier 703 (denoted here by the letter "A*") which corresponds thereto. The transmitter then transmits a joint message 704 to a receiver, which joint message 704 includes both the recovery identifier "A*" 705 and the message content "X" 706. And, as per these teachings, at least a portion of the joint message 704 as comprises a portion of the message content 706 is transmitted as per the dictates of the selected transmission type "A."

Upon receiving that portion of the joint message 704 as comprises the recovery identifier "A*" 705, the receiver can employ that information to identify and select the appropriate reception settings that permit compatible reception of that portion of the joint message 704 as comprises, at least in part, at least a part of the message content "X" 706.

So configured, a considerable increase in security occurs. In particular, it becomes increasingly difficult for an unauthorized party to spoof the receiver as mere data alone is insufficient to cause proper reception of the message content. Instead, considerable agility and flexibility with respect to types of transmission must also be supported.

Figure 8:
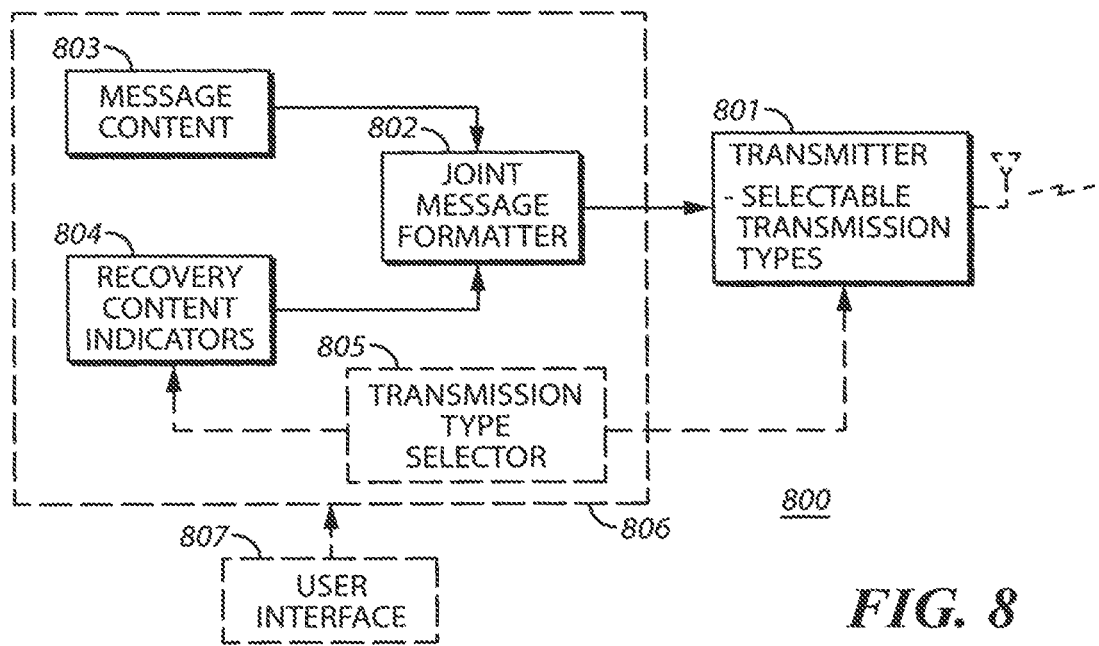
FIG. 8 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 8, an illustrative approach to a particular transmission platform will be provided.

This transmission platform 800 comprises a transmitter 801 that is preferably capable of various selectable types of transmission where, as described above, these various selectable types of transmission differ from one another as a function, at least in part, of corresponding transmission characteristics. In a preferred approach a single dynamically configurable transmitter serves this purpose. If desired, however, the transmitter 801 can comprise a plurality of discrete transmitters that differ from one another in the indicated manner. In a preferred embodiment this transmitter 801 comprises a wireless transmitter.

This transmission platform 800 preferably further comprises a joint message formatter 802 having an input that operably couples to receive message content 803 (as may be stored, for example, in a memory) and another input that operably couples to receive a selected recover content indicator 804 (as may be stored, for example, in another memory). So configured, the joint message formatter 802 serves to format and otherwise provide the joint message described above. If desired, this transmission platform 800 can further comprise a transmission type selector 805 that operably couples to both the recovery content indicators 804 (to facilitate selection of a particular one of the stored indicators) and the transmitter 801 (to facilitate selection of a particular type of transmission to be used when conveying the message content portion of the joint message).

The above-described elements can comprise discrete components if desired. It is also possible, however, to view the transmission platform 800 presented in FIG. 8 as a logical view where one or more of these elements are realized via shared facilities. For example, it may be useful for many applications to use a wholly or partially programmable platform such as a microprocessor 806 to effect the described functionality. It may also be useful, at least in some application settings as when the transmission platform 800 comprises a wireless remote control for a movable barrier operator, to further provide for a user interface 807 (such as, but not limited to, one or more user-assertable buttons, switches, keys, a touch screen, or the like). Such an interface can serve, for example, as a triggering mechanism to begin the described processes.

Figure 9:
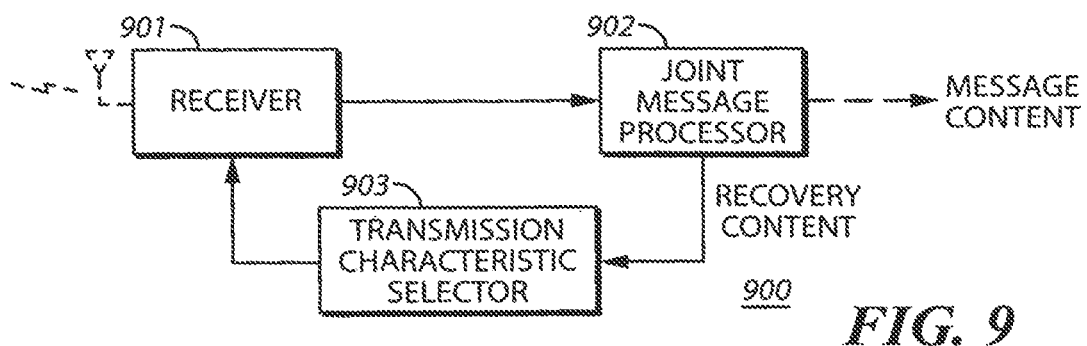
FIG. 9 comprises a block diagram as configured in accordance with various embodiments of the invention.

Referring now to FIG. 9, an illustrative approach to a particular reception platform will be provided. In this illustrative embodiment the reception platform 900 comprises a receiver 901 (for example, a wireless receiver) that is preferably capable of receiving various selectable types of transmissions wherein these selectable types of transmissions differ from one another as a function, at least in part, of corresponding transmission characteristics as have been presented above. As with the above-described transmitter, this receiver 901 can comprise a single selectively agile platform in this regard or can itself be comprised of a plurality of discrete receivers that each support some, but not all, of the selectable types of transmission. Pursuant to these teachings, this receiver 901 is configured and arranged to facilitate compatible reception of a joint message such as those described herein.

This receiver 901 operably couples to a joint message processor 902 which extracts the recovery content and message content as described above from a received joint message. The recovery content, in turn, is provided to a transmission characteristic selector 903 which in turn selects, in this embodiment, a particular transmission characteristic and hence a particular type of reception technique to be employed to facilitate compatible reception of the message content portion of the joint message.

So configured, a transmitter and a corresponding receiver can each readily support the teachings set forth herein. In particular, a plurality of differing types of transmission are selectively usable to effectively encode (in a manner of speaking) message content to be conveyed between the transmitter and the receiver (which message content may comprise, for example, an instruction to be carried out via the receiver). The receiver determines a particular type of reception to employ when receiving the transmission of the message content based, at least in part, upon a recovery indicator that also comprises a part of the overall message.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
providing a message content that includes a rolling code;
selecting from a plurality of different transmission characteristics a transmission characteristic based at least in part on at least a portion of the rolling code of the message content, the selected transmission characteristic including a data order;
selecting from a plurality of different recovery identifiers a particular recovery identifier correlated to the selected transmission characteristic, the selected recovery identifier including a data order identifier; and
wirelessly transmitting from a transmitter of a remote control to a movable barrier operator a message comprising a contiguous aggregation of the message content and the selected recovery identifier as uniquely corresponds to the selected transmission characteristic, wherein the message is configured to allow a receiver of the movable barrier operator to configure itself in response to receipt of the message.

2. The method of claim 1 wherein the selected transmission characteristic further includes at least one of:
a data rate;
a conversion symbol set
a spread spectrum practice;
a carrier modulation;
a bit inversion pattern;
a carrier frequency;
a bit interleaving pattern;
a bit pattern;
a joint message format;
a data inversion pattern.

3. The method of claim 1 wherein the selected recovery identifier further includes at least one of:
a data rate identifier;
a symbol conversion set identifier;
a spread spectrum practice identifier;
a carrier modulation identifier;
a bit inversion pattern identifier;
a carrier frequency identifier;
a bit interleaving pattern identifier;
a bit pattern identifier;
a joint message format identifier;
a data inversion pattern identifier.

4. The method of claim 1 wherein the message content comprises, at least in part, an identifier for at least one of:
a transmitting platform;
a receiving platform;
a communication system;
a communication system user.

5. The method of claim 1 wherein transmitting the message comprises transmitting a plurality of discrete messages.

6. The method of claim 1 wherein transmitting the message comprises serially transmitting data elements as comprise the message.

7. The method of claim 6 wherein serially transmitting the data elements as comprise the message comprises serially transmitting the data elements via a wireless connection.

8. The method of claim 1 wherein the message content comprises remote control signaling.

9. The method of claim 1 wherein the movable barrier operator includes a garage door operator, and wherein wirelessly transmitting the message from the transmitter of the remote control to the movable barrier operator includes wirelessly transmitting from the transmitter of the remote control to the garage door operator.

10. The method of claim 1, wherein the recovery identifier comprises a least significant bit or bits of the rolling code.

11. The method of claim 10, wherein the least significant bit or bits identifies the transmission characteristic.

12. An apparatus comprising:
a transmitter configured to provide a message content that includes a rolling code, the transmitter configured to select from a plurality of different transmission characteristics a particular transmission characteristic based at least in part on at least a portion of the rolling code of the message content, the selected transmission characteristic including a data order;

the transmitter further configured to select from a plurality of different recovery identifiers a particular recovery identifier correlated to the selected transmission characteristic, the selected recovery identifier including a data order identifier;

the transmitter further configured to wirelessly transmit a message to a movable barrier operator, the message comprising a continuous aggregation of the message content and the selected recovery identifier as uniquely corresponds to the selected transmission characteristic, wherein the message is configured to allow a receiver of the movable barrier operator to configure itself in response to receipt of the message.

13. The apparatus of claim 12 wherein the selected transmission characteristic further includes at least one of:
a data rate;
a conversion symbol set;
a spread spectrum practice;
a carrier modulation;
a bit inversion pattern;
a carrier frequency;
a bit interleaving pattern;
a bit pattern;
a data inversion pattern;
a joint message format.

14. The apparatus of claim 12 wherein the selected recovery identifier further includes at least one of:
a data rate identifier;
a symbol conversion set identifier;
a spread spectrum practice identifier;
a carrier modulation identifier;
a bit inversion pattern identifier;
a carrier frequency identifier;
a bit interleaving pattern identifier;
a bit pattern identifier;
a data inversion pattern identifier;
a joint message format identifier.

15. The apparatus of claim 12 wherein the message content comprises remote control signaling.

16. The apparatus of claim 12 wherein the recovery identifier comprises a least significant bit or bits of the rolling code of the message content.

17. The apparatus of claim 16 wherein the least significant bit or bits identifies the transmission characteristic.

18. The apparatus of claim 12 wherein the message content comprises, at least in part, an identifier for at least one of:
a transmitting platform;
a receiving platform;
a communication system;
a communication system user.

19. The apparatus of claim 12 wherein the transmitter is further configured to wirelessly transmit the message by transmitting a plurality of discrete messages.

20. The apparatus of claim 12 wherein the transmitter is further configured to serially transmit data elements that comprise the message.

21. The apparatus of claim 20 wherein to serially transmit the data elements as comprise the message comprises serially transmitting the data elements via a wireless connection.

22. The apparatus of claim 12 wherein the movable barrier operator includes a garage door operator, and wherein to wirelessly transmit the message to the movable barrier operator comprises wirelessly transmitting to the garage door operator from a remote control that includes the transmitter.

23. A method comprising:
providing a message content that includes a rolling code;
selecting from a plurality of different transmission characteristics a transmission characteristic based at least in part on at least a portion of the rolling code of the message content, the selected transmission characteristic including a data inversion pattern;
selecting from a plurality of different recovery identifiers a particular recovery identifier correlated to the selected transmission characteristic, the selected recovery identifier including a data inversion pattern identifier; and
wirelessly transmitting from a transmitter of a remote control to a movable barrier operator a message comprising a continuous aggregation of the message content and the selected recovery identifier as uniquely corresponds to the selected transmission characteristic,
wherein the message is configured to allow a receiver of the movable barrier operator to configure itself in response to receipt of the message.

24. The method of claim 23 wherein the selected transmission characteristic further includes at least one of:
a data rate;
a conversion symbol set
a spread spectrum practice;
a carrier modulation;
a bit inversion pattern;
a carrier frequency;
a bit interleaving pattern;
a bit pattern;
a joint message format;
a data order.

25. The method of claim 23 wherein the selected recovery identifier further includes at least one of:
a data rate identifier;
a symbol conversion set identifier;
a spread spectrum practice identifier;
a carrier modulation identifier;
a bit inversion pattern identifier;
a carrier frequency identifier;
a bit interleaving pattern identifier;
a bit pattern identifier;
a joint message format identifier;
a data order identifier.

26. The method of claim 23 wherein the message content comprises, at least in part, an identifier for at least one of:
a transmitting platform;
a receiving platform;
a communication system;
a communication system user.

27. The method of claim 23 wherein transmitting the message comprises transmitting a plurality of discrete messages.

28. The method of claim 23 wherein transmitting the message comprises serially transmitting data elements as comprise the message.

29. The method of claim 28 wherein serially transmitting the data elements as comprise the message comprises serially transmitting the data elements via a wireless connection.

30. The method of claim 23 wherein the message content comprises remote control signaling.

31. The method of claim 23 wherein the movable barrier operator includes a garage door operator, and wherein wirelessly transmitting the message from the transmitter of the remote control to the movable barrier operator includes wirelessly transmitting from the transmitter of the remote control to the garage door operator.

32. The method of claim 23, wherein the recovery identifier comprises a least significant bit or bits of the rolling code.

33. The method of claim 32, wherein the least significant bit or bits identifies the transmission characteristic.

34. An apparatus comprising:
a transmitter configured to provide a message content that includes a rolling code, the transmitter configured to select from a plurality of different transmission characteristics a particular transmission characteristic based at least in part on at least a portion of the rolling code of the message content, the selected transmission characteristic including a data inversion pattern;
the transmitter further configured to select from a plurality of different recovery identifiers a particular recovery identifier correlated to the selected transmission characteristic, the selected recovery identifier including a data inversion pattern identifier;
the transmitter further configured to wirelessly transmit a message to a movable barrier operator, the message comprising a contiguous aggregation of the message content and the selected recovery identifier as uniquely corresponds to the selected transmission characteristic,
wherein the message is configured to allow a receiver of the movable barrier operator to configure itself in response to receipt of the message.

35. The apparatus of claim 34 wherein the selected transmission characteristic further includes at least one of:
a data rate;
a conversion symbol set;
a spread spectrum practice;
a carrier modulation;
a bit inversion pattern;
a carrier frequency;
a bit interleaving pattern;
a bit pattern;
a joint message format;
a data order.

36. The apparatus of claim 34 wherein the selected recovery identifier further includes at least one of:
a data rate identifier;
a symbol conversion set identifier;
a spread spectrum practice identifier;
a carrier modulation identifier;
a bit inversion pattern identifier;
a carrier frequency identifier;
a bit interleaving pattern identifier;
a bit pattern identifier;
a joint message format identifier;
a data order identifier.

37. The apparatus of claim 34 wherein the message content comprises remote control signaling.

38. The apparatus of claim 34 wherein the recovery identifier comprises a least significant bit or bits of the rolling code of the message content.

39. The apparatus of claim 38 wherein the least significant bit or bits identifies the transmission characteristic.

40. The apparatus of claim 34 wherein the message content comprises, at least in part, an identifier for at least one of:
a transmitting platform;
a receiving platform;
a communication system;
a communication system user.

41. The apparatus of claim 34 wherein the transmitter is further configured to wirelessly transmit the message by transmitting a plurality of discrete messages.

42. The apparatus of claim 34 wherein the transmitter is further configured to serially transmit data elements as comprise the message.

43. The apparatus of claim 42 wherein to serially transmit the data elements as comprise the message comprises serially transmitting the data elements via a wireless connection.

44. The apparatus of claim 34 wherein the movable barrier operator includes a garage door operator, and wherein to wirelessly transmit the message to the movable barrier operator comprises wirelessly transmitting to the garage door operator from a remote control that includes the transmitter.

* * * * *

UNITED STATES PATENT AND TRADEMARK OFFICE
CERTIFICATE OF CORRECTION

PATENT NO.       : 10,862,924 B2
APPLICATION NO.  : 14/867633
DATED            : December 8, 2020
INVENTOR(S)      : James J. Fitzgibbon and Edward Thomas Laird Page 1 of 1

It is certified that error appears in the above-identified patent and that said Letters Patent is hereby corrected as shown below:

In the Specification

Column 1, Line 10 (approximately): after "transmission characteristics,"" insert -- which issued as U.S. Patent No. 9,148,409 on September 29, 2015, --.

In the Claims

Column 8, Line 12, in Claim 2: delete "set" and insert -- set; --, therefor; and Column 10, Line 24, in Claim 24: delete "set" and insert -- set; --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*